US012652686B2

(12) United States Patent
Park et al.

(10) Patent No.: US 12,652,686 B2
(45) Date of Patent: Jun. 9, 2026

(54) METHOD AND DEVICE FOR PERFORMING SL DRX OPERATION IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 18/572,084

(22) PCT Filed: Jul. 7, 2022

(86) PCT No.: PCT/KR2022/009821
§ 371 (c)(1),
(2) Date: Dec. 19, 2023

(87) PCT Pub. No.: WO2023/282651
PCT Pub. Date: Jan. 12, 2023

(65) Prior Publication Data
US 2024/0284492 A1 Aug. 22, 2024

(30) Foreign Application Priority Data

Jul. 7, 2021 (KR) ........................ 10-2021-0088860

(51) Int. Cl.
*H04W 72/40* (2023.01)
*H04W 24/08* (2009.01)
(Continued)

(52) U.S. Cl.
CPC ........... *H04W 72/40* (2023.01); *H04W 24/08* (2013.01); *H04W 72/0453* (2013.01); *H04W 72/25* (2023.01); *H04W 76/28* (2018.02)

(58) Field of Classification Search
CPC . H04W 72/40; H04W 24/08; H04W 72/0453; H04W 72/25; H04W 76/28;
(Continued)

(56) References Cited

U.S. PATENT DOCUMENTS 11,997,744 B2 * 5/2024 Jeong .................... H04L 1/1896
2022/0346120 A1 * 10/2022 Wang .................. H04W 72/044

FOREIGN PATENT DOCUMENTS

KR 1020210016278 2/2021
KR 1020210018773 2/2021
(Continued)

OTHER PUBLICATIONS

PCT International Application No. PCT/KR2022/009821, International Search Report dated Oct. 2022, 3 pages.
(Continued)

*Primary Examiner* — Brandon J Miller
(74) *Attorney, Agent, or Firm* — LEE, HONG, DEGERMAN, KANG & WAIMEY

(57) ABSTRACT

A method by which a first device performs wireless communication, and a device for supporting same are presented. The method comprises the steps of: acquiring an SL DRX configuration including information related to an SL DRX activation time of a first device; receiving, from a second device, information related to a plurality of resources, the information including information related to a frequency resource of the plurality of resources and information related to a time resource of the plurality of resources; performing a monitoring operation within the SL DRX activation time based on resource information; and determining, in N resources from among the plurality of resources, on the basis that the first SCI has not been received from the second device, resources after the N resources, for scheduling of a first PSSCH and second SCI, to be non-valid resources
(Continued)

obtaining sidelink (SL) discontinuous reception (DRX) configuration including information related to SL DRX active time of a first device ⌐ S1110 receiving, from a second device, information related to a plurality of resources ⌐ S1120 performing a monitoring operation within resource information-based SL DRX active time ⌐ S1130 based on not receiving, from a second device, first sidelink control information (SCI) through first physical sidelink control channel (PSCCH), for scheduling a first physical sidelink shared channel (PSSCH) and a second SCI, on N resources among a plurality of resources, determining a resource after N resources as a non-valid resource ⌐ S1140 through the first PSCCH, wherein N can be a positive integer.

20 Claims, 15 Drawing Sheets

(51) Int. Cl.
*H04W 72/0453* (2023.01)
*H04W 72/25* (2023.01)
*H04W 76/28* (2018.01)

(58) Field of Classification Search
CPC . H04W 76/14; H04W 52/0216; H04W 72/23; H04W 76/23; H04W 72/02; H04W 4/40; H04W 92/18
See application file for complete search history.

(56) References Cited

FOREIGN PATENT DOCUMENTS

| WO | WO-2018064477 A1 * | 4/2018 | ............ H04W 76/28 |
|----|-----|-----|-----|
| WO | 2021119474 | 6/2021 | |
| WO | WO-2021119474 A1 * | 6/2021 | ............ H04W 72/20 |

OTHER PUBLICATIONS

Qualcomm Incorporated, "Discussion on SL DRX Timers and Others," 3GPP TSG RAN WG2 Meeting #114-e, R1-2105906, May 2021, 6 pages.
Fujitsu, "Considerations on partial sensing and DRX in NR Sidelink," 3GPP TSG RAN WG1 Meeting #105-e, R1-2105066, May 2021, 18 pages.

* cited by examiner

Resource grid

1RB=12 subcarriers

A BWP

A carrier
(up to 3300 subcarriers,
i.e., 275 RBs)

1 RE

1subcarrier 1 symbol k=0 l=0

PRB 0 (Point A) in reference resource block (a)                    (b)

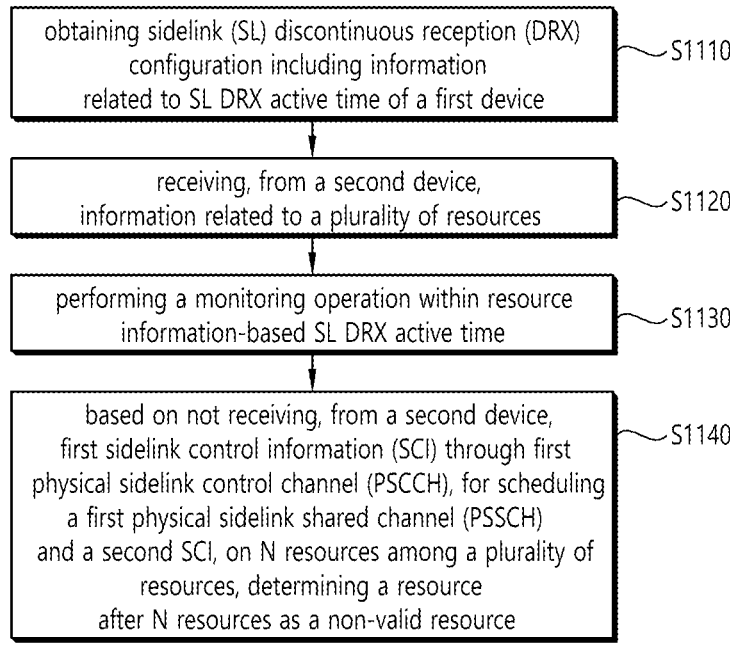

obtaining sidelink (SL) discontinuous reception (DRX) configuration including information related to SL DRX active time of a first device ~S1110 receiving, from a second device, information related to a plurality of resources ~S1120 performing a monitoring operation within resource information-based SL DRX active time ~S1130 based on not receiving, from a second device, first sidelink control information (SCI) through first physical sidelink control channel (PSCCH), for scheduling a first physical sidelink shared channel (PSSCH) and a second SCI, on N resources among a plurality of resources, determining a resource after N resources as a non-valid resource ~S1140

FIG. 12

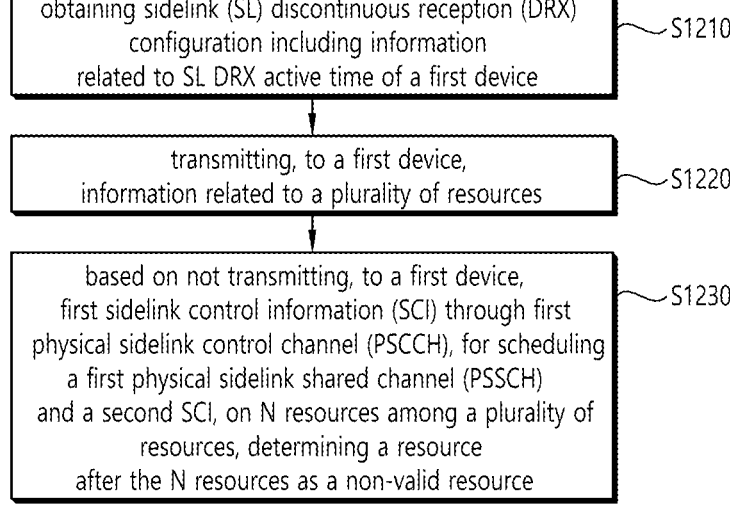

obtaining sidelink (SL) discontinuous reception (DRX) configuration including information related to SL DRX active time of a first device ~S1210 transmitting, to a first device, information related to a plurality of resources ~S1220 based on not transmitting, to a first device, first sidelink control information (SCI) through first physical sidelink control channel (PSCCH), for scheduling a first physical sidelink shared channel (PSSCH) and a second SCI, on N resources among a plurality of resources, determining a resource after the N resources as a non-valid resource ~S1230

FIG. 16

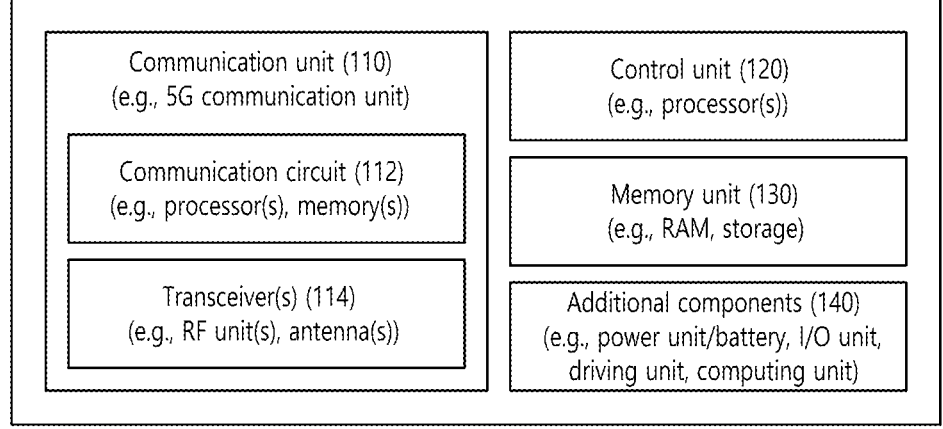

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 17

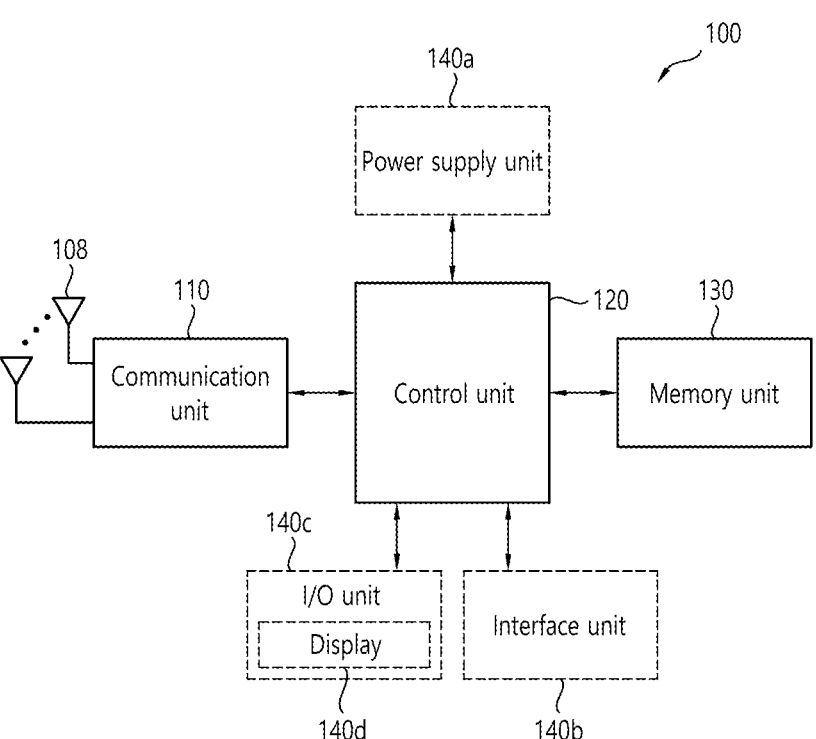

100

140a

Power supply unit

108

110

Communication
unit

120

Control unit

130

Memory unit

140c

I/O unit

Display

140d

Interface unit

METHOD AND DEVICE FOR PERFORMING SL DRX OPERATION IN NR V2X

CROSS-REFERENCE TO RELATED APPLICATION(S)

This application is the National Stage filing under 35 U.S.C. 371 of International Application No. PCT/KR2022/009821, filed on Jul. 7, 2022, which claims the benefit of earlier filing date and right of priority to Korean Application No. 10-2021-0088860, filed on Jul. 7, 2021, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

In one embodiment, SL DRX operation may be supported in NR V2X. For example, for power saving operation of the RX UE performing sidelink DRX operation, a SL DRX timer may be operated based on TX UE mode 2 periodic resource reservation. For example, RX UE may receive new transport block (TB) from TX UE regardless of periodic traffic or aperiodic traffic. For example, when TX UE transmitting new TB to the TX UE regardless of periodic traffic or aperiodic traffic, RX UE may restart a SL DRX inactivity timer.

Therefore, for example, for periodic traffic or aperiodic traffic, RX may further perform SL DRX operation based on resource information unnecessarily. For example, for expected transmission for periodic traffic or aperiodic traffic, RX UE may perform monitoring operation unnecessarily.

For example, for expected transmission for periodic traffic or aperiodic traffic, by performing monitoring operation unnecessarily by RX UE, the power of the RX UE may be wasted. For example, for expected a plurality of transmissions for periodic traffic or aperiodic traffic, monitoring of the RX UE may not be performed effectively.

In one embodiment, a method for performing wireless communication by a first device may be provided. For example, the first device may obtain sidelink (SL) discontinuous reception (DRX) configuration including information related to SL DRX active time of the first device. For example, the first device may receive, from a second device, information related to a plurality of resources. For example, the information related to the plurality of resources may include information related to a frequency resource of the plurality of resources and information related to a time resource of the plurality of resources. For example, the first device may perform a monitoring operation within resource information-based SL DRX active time. For example, based on not receiving, from the second device, first sidelink control information (SCI) through first physical sidelink control channel (PSCCH), for scheduling a first physical sidelink shared channel (PSSCH) and a second SCI, on N resources among the plurality of resources, the first device may determine a resource after the N resources as a non-valid resource. For example, N may be a positive integer.

In one embodiment, the first device performing wireless communication may be provided. The first device comprising at least one memory storing instructions: at least one transceiver; and at least one processor connected to the at least one memory and the at least one transceiver, wherein the at least one processor is adapted to execute instructions to perform operations comprising, may obtain sidelink (SL) discontinuous reception (DRX) configuration including information related to SL DRX active time of the first device. For example, based on the instructions executed by the at least one processor, the first device, may receive, from a second device, information related to a plurality of resources. For example, the information related to the plurality of resources may include information related to a frequency resource of the plurality of resources and information related to a time resource of the plurality of resources. For example, based on the instructions executed by the at least one processor, the first device, may perform a monitoring operation within resource information-based SL DRX active time. For example, based on the instructions executed by the at least one processor, the first device, based on not receiving, from the second device, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

In one embodiment, the apparatus configured for control the first user equipment may be provided. The apparatus comprising at least one memory storing instructions: at least one transceiver; and at least one processor connected to the at least one memory and the at least one transceiver, based on the instructions executed by the at least one processor, the first user equipment, may obtain sidelink (SL) discontinuous reception (DRX) configuration including information related to SL DRX active time of the first user equipment. For example, based on the instructions executed by the at least one processor, the first user equipment, may receive, from a second user equipment, information related to a plurality of resources. For example, the information related to the plurality of resources may include information related to a frequency resource of the plurality of resources and information related to a time resource of the plurality of resources. For example, based on the instructions executed by the at least one processor, the first user equipment, may perform a monitoring operation within resource information-based SL DRX active time. For example, based on the instructions executed by the at least one processor, the first user equipment, based on not receiving, from the second user equipment, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

In one embodiment, a non-transitory computer-readable storage medium storing instructions may be provided. The instructions, when executed by at least one processor, cause the at least one processor to: obtain sidelink (SL) discontinuous reception (DRX) configuration including information related to SL DRX active time of the first device. For example, the instructions, when executed by at least one processor, cause the at least one processor: to receive, from a second device, information related to a plurality of resources. For example, the information related to the plurality of resources may include information related to a frequency resource of the plurality of resources and information related to a time resource of the plurality of resources. For example, the instructions, when executed by at least one processor, cause the at least one processor to: perform a monitoring operation within resource information-based SL DRX active time. For example, the instructions, when executed by at least one processor, cause the at least one processor: based on not receiving, from the second device, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

In one embodiment, a method for performing wireless communication by a second device may be provided. The second device may obtain sidelink (SL) discontinuous reception (DRX) configuration including information related to SL DRX active time of the first device. For example, the second device may transmit, to a first device, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. For example, based on not transmitting, to the first device, first sidelink control information (SCI) through first physical sidelink control channel (PSCCH), for scheduling a first physical sidelink shared channel (PSSCH) and a second SCI, on N resources among the plurality of resources, the second device may determine a resource after the N resources as a non-valid resource. For example, N may be a positive integer.

In one embodiment, the second device performing wireless communication may be provided. The second device comprising at least one memory storing instructions; at least one transceiver; and at least one processor connected to the at least one memory and the at least one transceiver, based on the instructions executed by the at least one processor, may obtain sidelink (SL) discontinuous reception (DRX) configuration including information related to SL DRX active time of the first device. For example, based on the instructions executed by the at least one processor, may transmit, to a first device, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. For example, based on the instructions executed by the at least one processor, based on not transmitting, to the first device, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

In one embodiment, the apparatus configured for control the second user equipment may be provided. The apparatus comprising at least one processor; and at least one memory executably connected by the at least one processor and storing instructions; based on the instructions executed by the at least one processor, the second user equipment, may obtain sidelink (SL) discontinuous reception (DRX) configuration including information related to SL DRX active time of the first user equipment. For example, based on the instructions executed by the at least one processor, the second user equipment, may transmit, to a first user equipment, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. For example, based on the instructions executed by the at least one processor, the second user equipment, based on not transmitting, to the first user equipment, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

In one embodiment, a non-transitory computer-readable storage medium storing instructions may be provided. The instructions, when executed by at least one processor, cause the at least one processor: the second device may obtain sidelink (SL) discontinuous reception (DRX) configuration including information related to SL DRX active time of the first device. The instructions, when executed by at least one processor, cause the at least one processor: the second device may transmit, to a first device, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. The instructions, when executed by at least one processor, cause the at least one processor: based on not transmitting, to the first device, first sidelink control information (SCI) through first physical sidelink control channel (PSCCH), for scheduling a first physical sidelink shared channel (PSSCH) and a second SCI, on N resources among the plurality of resources, the second device may determine a resource after the N resources as a non-valid resource. For example, N may be a positive integer.

A UE can efficiently perform sidelink communication.

BRIEF DESCRIPTION OF THE DRAWINGS

FIG. 2 shows a radio protocol architecture, based on an embodiment of the present disclosure.

FIG. 4 shows a structure of a slot of an NR frame, based on an embodiment of the present disclosure.

FIG. 11 shows a method for a first device to perform wireless communication, according to an embodiment of the present disclosure.

FIG. 12 shows a method for a second device to perform wireless communication according to an embodiment of the present disclosure.

FIG. 16 shows another example of a wireless device, based on an embodiment of the present disclosure.

FIG. 17 shows a hand-held device, based on an embodiment of the present disclosure.

FIG. 18 shows a vehicle or an autonomous vehicle, based on an embodiment of the present disclosure.

DETAILED DESCRIPTION

Figure 1:
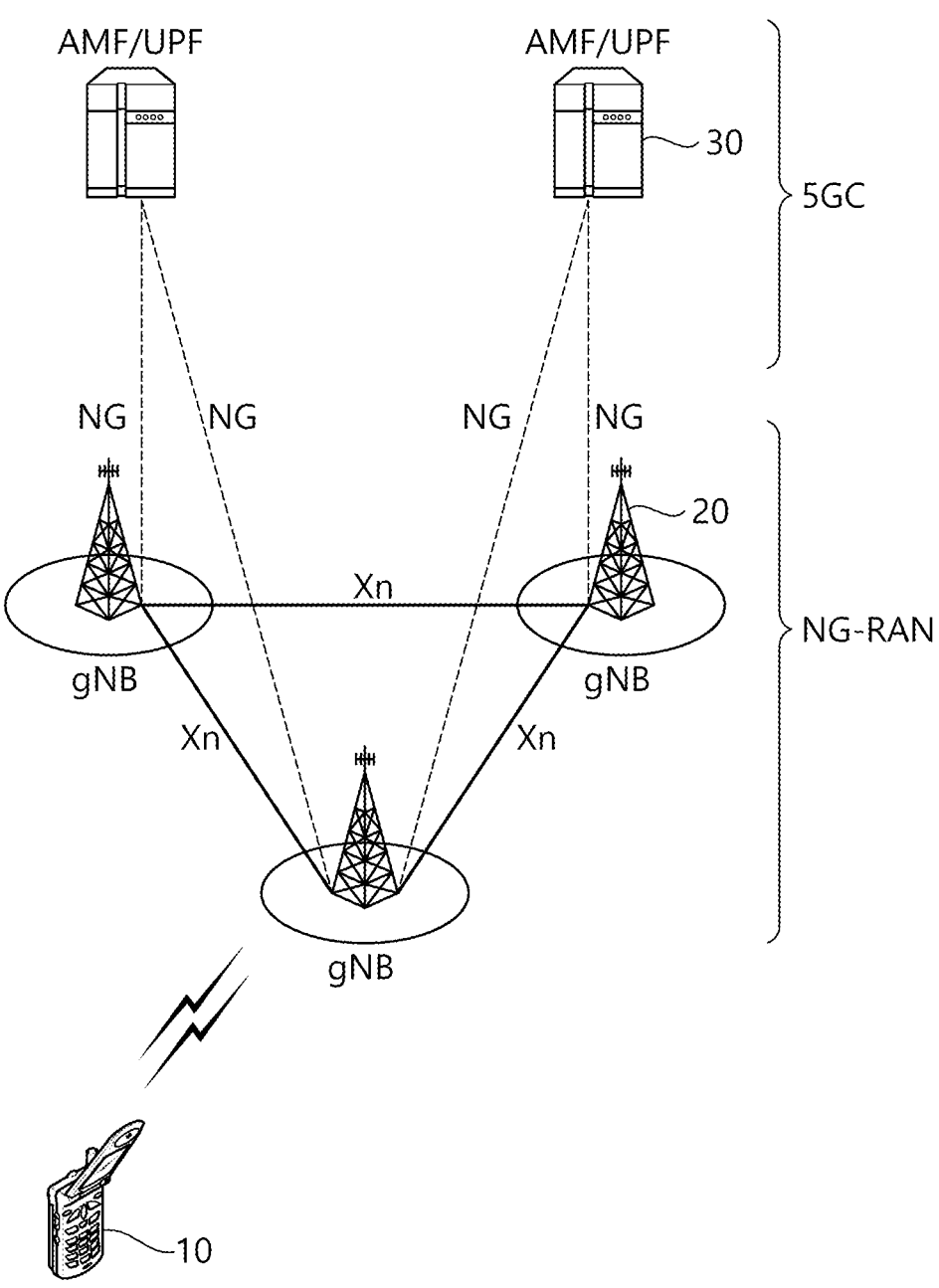
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, "when, if, or in case of" may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
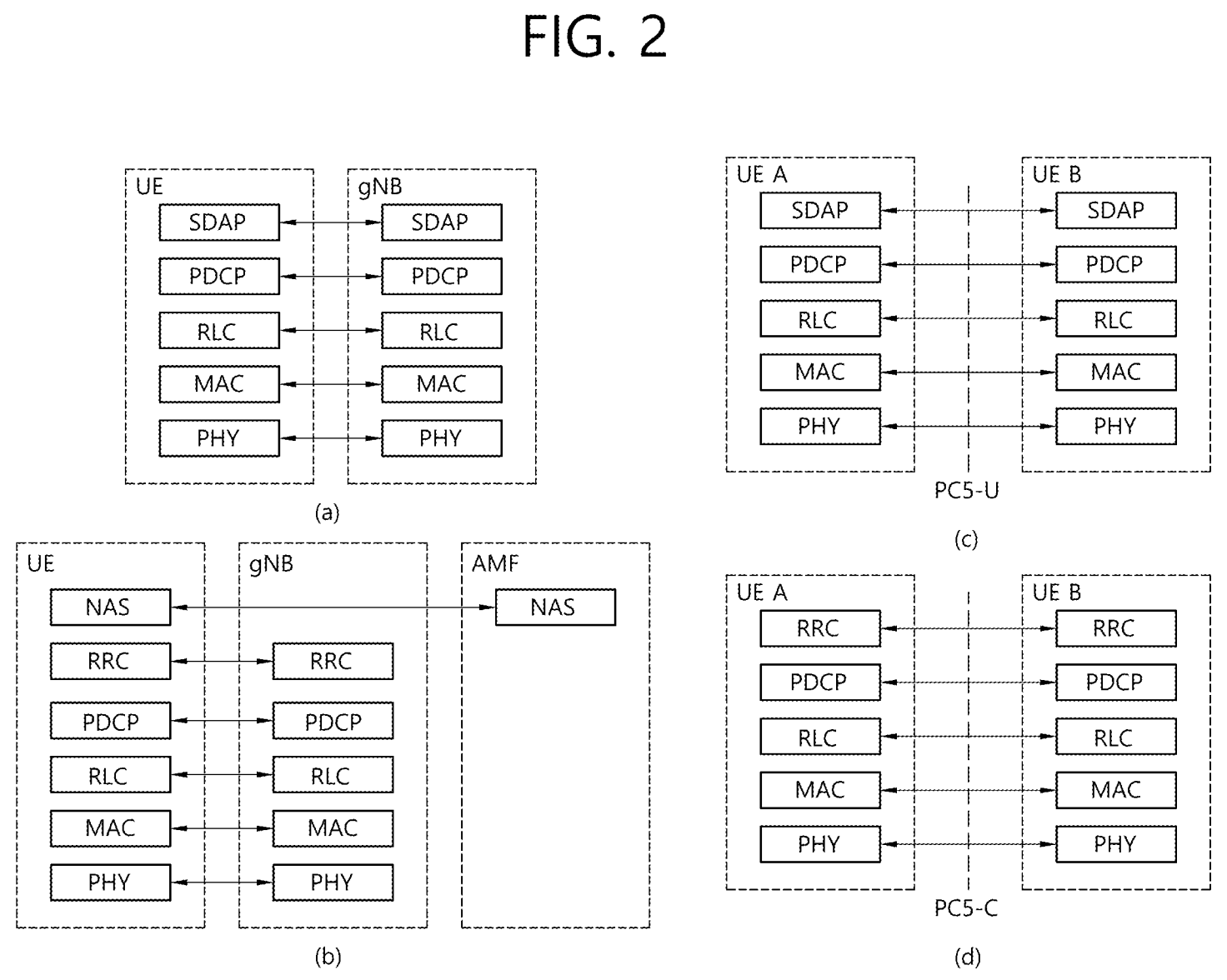

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (Qos) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
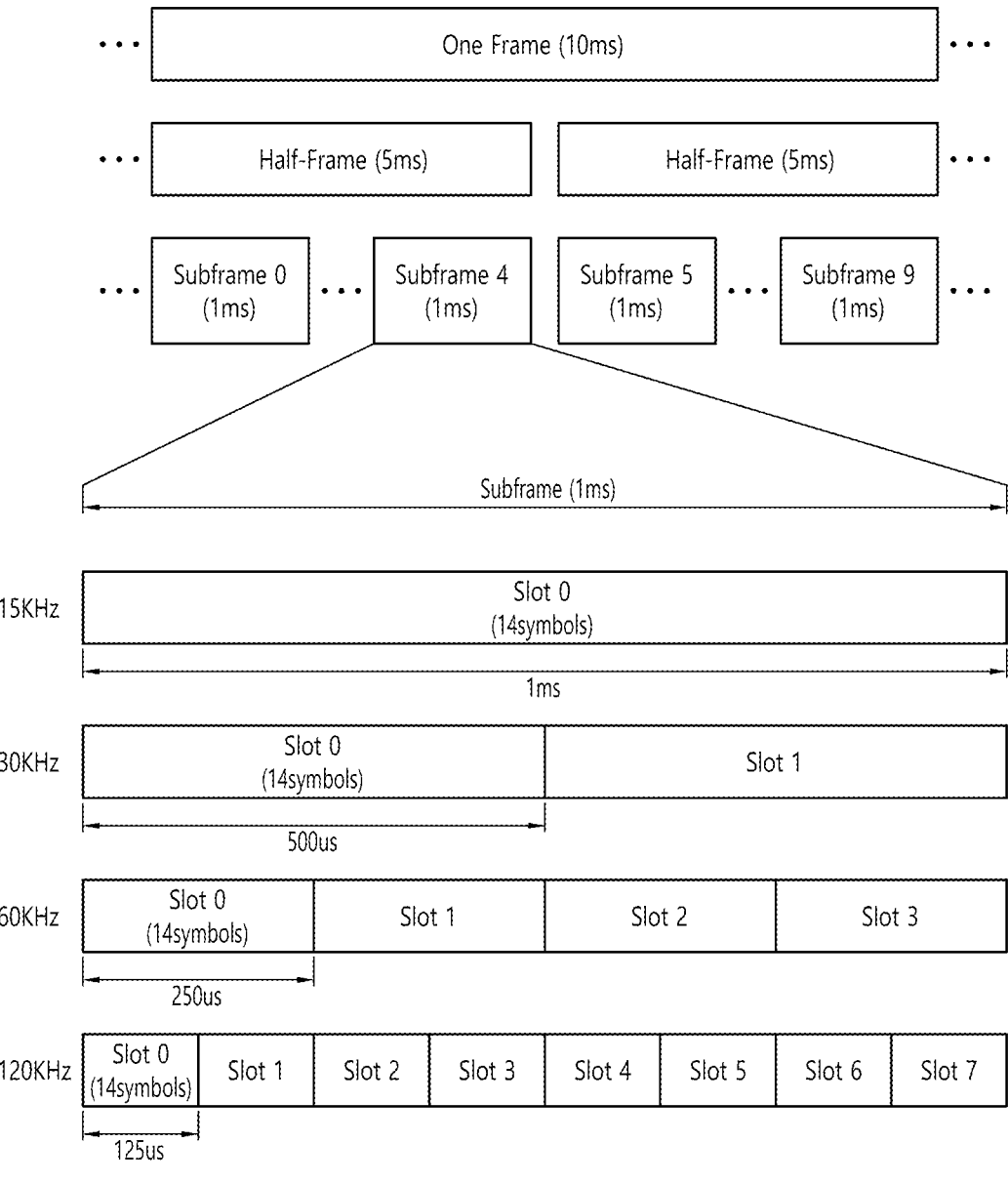
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{frame,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 KHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHZ, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
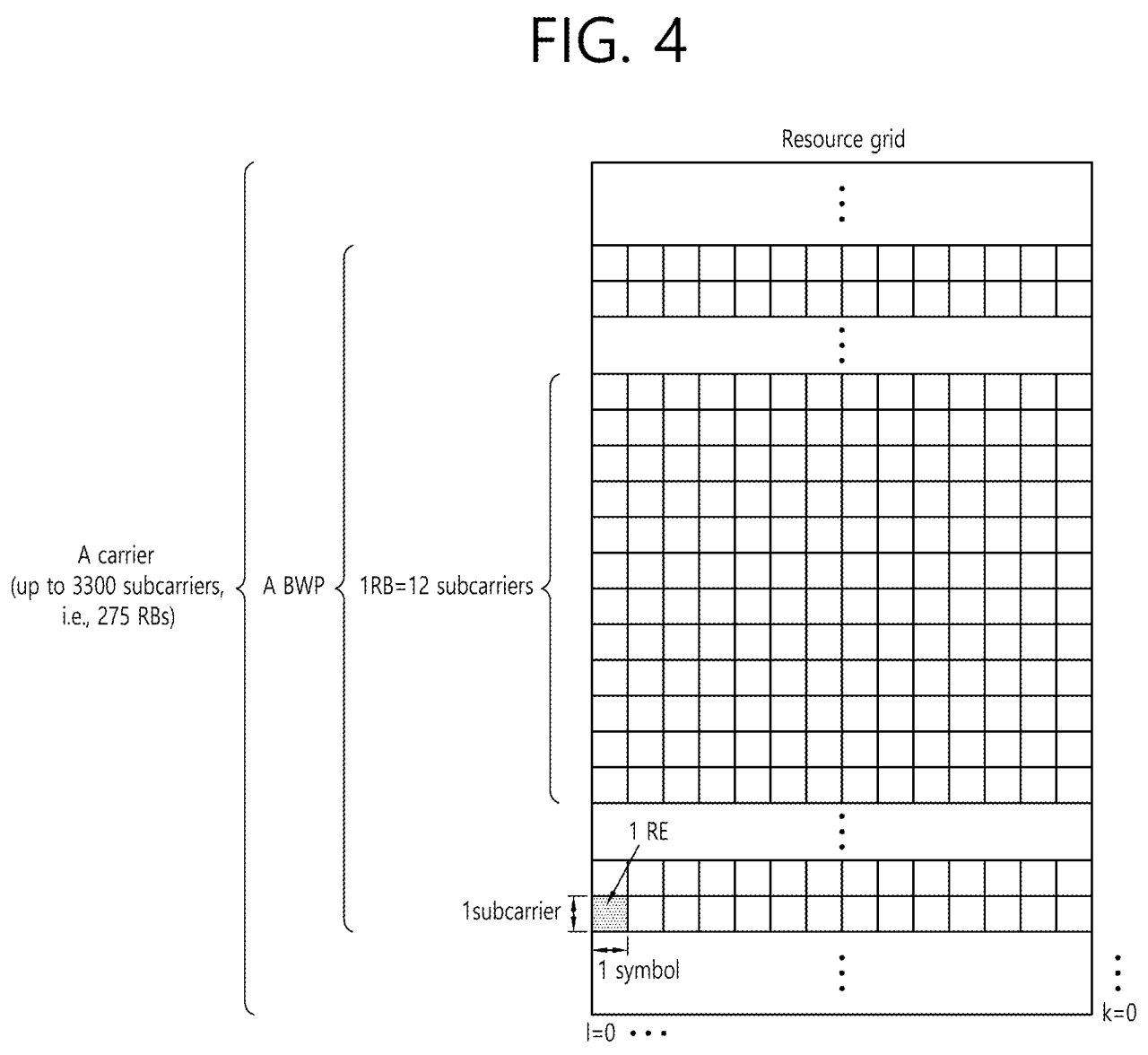

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
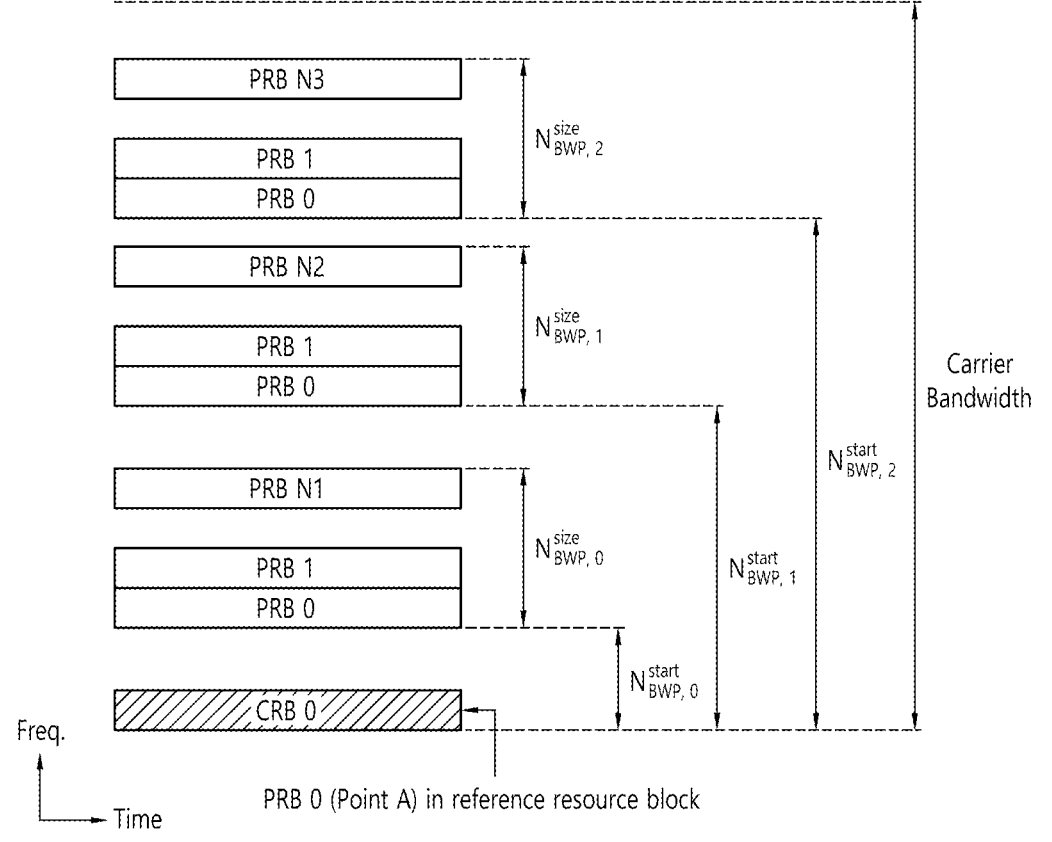
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
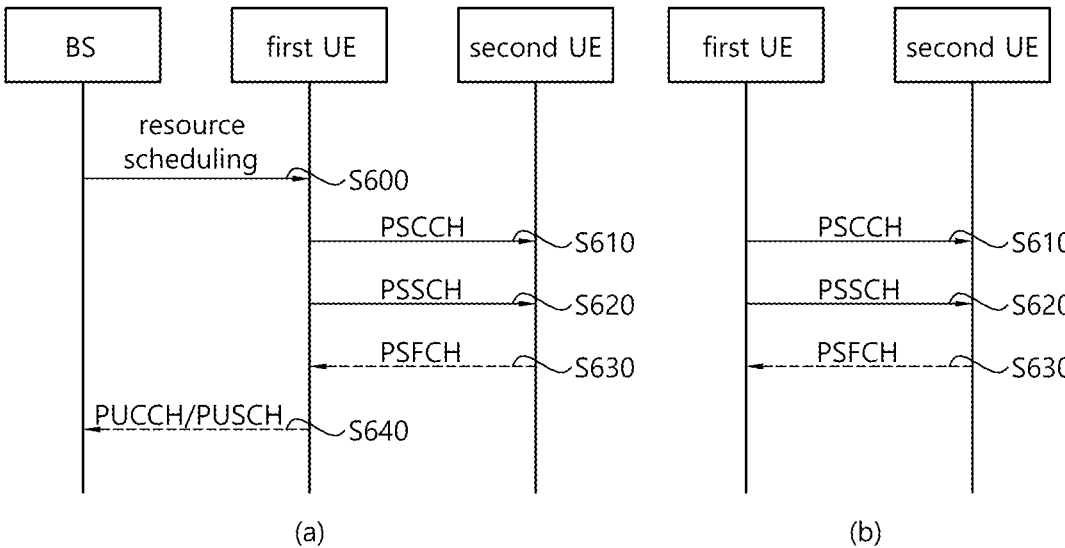
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and $2^{nd}$-stage-SCI on PSSCH.

The following information is transmitted by means of the SCI format 1-A:

Priority-3 bits

Frequency resource assignment-ceiling ($\log_2$ ($N^{SL}_{subChannel}(N^{SL}_{subChannel}+1)/2)$) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment-5 bits when the value of the higher layer parameter sl-MaxNumPerReserve is configured to 2; otherwise 9 bits when the value of the higher layer parameter sl-MaxNumPerReserve is configured to 3

Resource reservation period-ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured: 0 bit otherwise DMRS pattern-ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format-2 bits as defined in Table 5

Beta_offset indicator-2 bits as provided by higher layer parameter sl-BetaOffsets2ndSCI Number of DMRS port-1 bit as defined in Table 6

Modulation and coding scheme-5 bits

Additional MCS table indicator-1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication-1 bit if higher layer parameter sl-PSFCH-Period=2 or 4; 0 bit otherwise Reserved-a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number-4 bits
New data indicator-1 bit
Redundancy version-2 bits
Source ID-8 bits
Destination ID-16 bits
HARQ feedback enabled/disabled indicator-1 bit
Cast type indicator-2 bits as defined in Table 7
CSI request-1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number-4 bits
New data indicator-1 bit
Redundancy version-2 bits
Source ID-8 bits
Destination ID-16 bits
HARQ feedback enabled/disabled indicator-1 bit
Zone ID-12 bits
Communication range requirement-4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
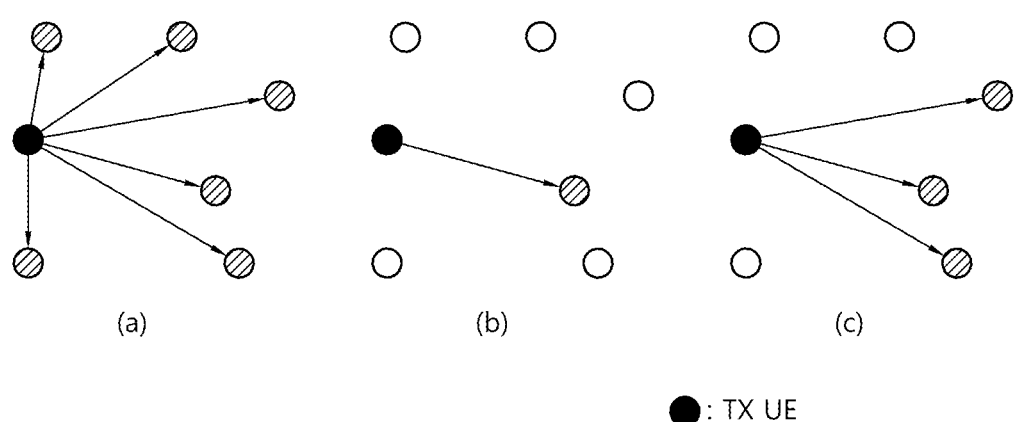
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Hereinafter, UE procedure for reporting HARQ-ACK on sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k (0 \leq k < T'_{max})$ has a PSFCH transmission occasion resource if $k$ mod $N^{PSFCH}_{PSSCH} = 0$, where $t'^{SL}_k$ is a slot that belongs to the resource pool, $T_{max}$ is a number of slots that belong to the resource pool within 10240 msec, and $N^{PSFCH}_{PSSCH}$ is provided by sl-PSFCH-Period-r16. A UE may be indicated A UE determines a $m_0$ value, for computing a value of cyclic shift a, from a cyclic shift pair index corresponding to a PSFCH resource index and from $N^{PSFCH}_{CS}$ using Table 8.

TABLE 8

| | $m_0$ | | | | | |
|---|---|---|---|---|---|---|
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 | by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots related to a PSFCH slot that is less than or equal to $N^{PSFCH}_{PSSCH}$, the UE allocates the $[(i+j \cdot N^{PSFCH}_{PSSCH}) \cdot M^{PSFCH}_{subch,slot}$, $(i+1+j \cdot N^{PSFCH}_{PSSCH}) \cdot M^{PSFCH}_{subch,slot}-1]$ PRBs from the $M^{PSFCH}_{PRB,set}$ PRBs to slot i among the PSSCH slots related to the PSFCH slot and sub-channel j, where $M^{PSFCH}_{subch,slot}=M^{PSFCH}_{PRB,set}/(N_{subch} \cdot N^{PSFCH}_{PSSCH})$, $0 \le i < N^{PSFCH}_{PSSCH}$, $0 \le j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$.

A UE determines a number of PSFCH resources available for multiplexing HARQ-ACK information in a PSFCH transmission as $R^{PSFCH}_{PRB,CS}=N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers, $N^{PSFCH}_{type}=1$ and the $M^{PSFCH}_{subch,slot}$ PRBs are related to the starting sub-channel of the corresponding PSSCH
$N^{PSFCH}_{type}=N^{PSSCH}_{subch}$ and the $N^{PSSCH}_{subch} \cdot M^{PSFCH}_{subch,slot}$ PRBs are related to one or more sub-channels from the $N^{PSSCH}_{subch}$ sub-channels of the corresponding PSSCH The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID})$ mod $R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_{CS}$ value, for computing a value of cyclic shift a, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Hereinafter, a procedure for a UE to report HARQ-ACK in an uplink will be described.

For reporting HARQ-ACK information generated by a UE based on HARQ-ACK information obtained by the UE from a PSFCH reception or from an absence of PSFCH reception, the UE may be provided with a PUCCH resource or a PUSCH resource. A UE reports HARQ-ACK information for a primary cell of a PUCCH group among cells in which the UE monitors a PDCCH for detection of DCI format 3_0.

For type 1 or type 2 SL configuration grant PSSCH transmission by a UE within a time period provided by sl-PeriodCG, the UE generates HARQ-ACK information in response to PSFCH reception in order to multiplex within a PUCCH transmission occasion after the last time resource in a set of time resources.

For each PSFCH reception opportunity among PSFCH reception opportunities, the UE generates HARQ-ACK information to be reported during PUCCH or PUSCH transmission. A UE may be indicated in SCI format to do one of the following, and a UE configures a HARQ-ACK codeword using HARQ-ACK information if applicable. Here, as one of the following for a UE to perform:

if a UE receives a PSFCH related to SCI format 2-A having a cast type indicator field value of "10",
the UE generates HARQ-ACK information with the same value as the HARQ-ACK information value determined when the UE receives a PSFCH within a PSFCH reception opportunity, and generates a NACK if it is determined that a PSFCH is not received within a PSFCH reception opportunity.

if a UE receives a PSFCH related to SCI format 2-A in which a cast type indicator field value is "01", among PSFCH resources corresponding to all ID $M_{IDS}$ of a plurality of UEs expected to receive a PSSCH, the UE generates an ACK when determining an ACK among at least one PSFCH reception opportunity among the number of PSFCH reception opportunities; otherwise, the UE generates a NACK if a UE receives a PSFCH related to SCI format 2-B or SCI format 2-A having a cast type indicator field value of "11", when a UE determines an absence of PSFCH reception for each PSFCH reception opportunity among reception opportunities of PSFCH, the UE generate an ACK: otherwise, the UE generate a NACK.

After a UE transmits a PSSCH and receives a PSFCH in response to a PSFCH resource opportunity, a priority value of HARQ-ACK information is the same as a priority value of a PSSCH transmission related to a PSFCH reception opportunity providing HARQ-ACK information.

When a PSFCH is not received at any PSFCH reception opportunity related to PSSCH transmission within a resource provided by DCI format 3_0 including a CRC scrambled by SL-RNTI, due to prioritization, or if a UE is provided with PUCCH resources for reporting HARQ-ACK information within resources provided within a single period for a configured grant, a UE generates a NACK. A priority value of a NACK is the same as a priority value of a PSSCH that is not transmitted due to a prioritization.

If a UE does not transmit a PSCCH including an SCI format 1-A for scheduling a PSSCH among any of resources provided by a configured grant within a single period, and the UE is provided with a PUCCH resource for reporting HARQ-ACK information, the UE generates an ACK. A priority value of ACK is equal to the largest priority value among possible priority values for a configuration grant.

After the end of the last symbol of the last PSFCH reception opportunity, to report HARQ-ACK information that starts earlier than $(N+1)*(2048+144)*\kappa*2^\mu*T_c$, a UE does not expect to be provided with a PUCCH resource or a PUSCH resource among several PSFCH reception opportunities in which the UE generates HARQ-ACK information reported during PUCCH or PUSCH transmission.

$\mu=\min(\mu SL, \mu UL)$, where $\mu_{SL}$ is an SCS setting of an SL BWP and $\mu_{UL}$ is an SCS setting of an active UL BWP of a primary cell.

N is determined from u according to Table 11.

TABLE 11

| μ | N |
|---|---|
| 0 | 14 |
| 1 | 18 |
| 2 | 28 |
| 3t | 32 |

For the number of PSFCH reception opportunities that are related to PUCCH transmission and end with n slots, a UE provides HARQ-ACK information generated during PUCCH transmission within n+k slots according to overlapping conditions. Here, k is the number of slots indicated by a PSFCH-to-HARQfeedback timing indicator field (if present) among DCI formats indicating a slot related to PUCCH transmission to report HARQ-ACK information, or here, k may be provided by sl-PSFCH-ToPUCCH-CG-Type1-r16. Assuming that the start of a sidelink frame is the same as the start of a downlink frame, k=0 corresponds to the last slot for PUCCH transmission overlapping with the last PSFCH reception opportunity.

In the case of PSSCH transmission by a UE scheduled by a DCI format or in the case of type 2 PSSCH transmission of an SL configuration grant activated by a DCI format, in the DCI format, a PUCCH resource indicator field is 0, and when a value of a PSFCH-to-HARQ feedback timing indicator field (if present) is 0, it indicates to a UE that a PUCCH resource is not provided. Regarding transmission of Type 1 PSSCH of SL configured grant, a PUCCH resource may be provided by sl-NIPUCCH-AN-r16 and sl-PSFCH-To-PUCCH-CG-Type1-r16. If a PUCCH resource is not provided, a UE does not transmit a PUCCH including HARQ-ACK information generated from among a plurality of PSFCH reception opportunities.

In the case of PUCCH transmission including HARQ-ACK information, a UE determines a PUCCH resource set for the HARQ-ACK information bit and then determines a PUCCH resource. PUCCH resource determination has a PSFCH-to-HARQfeedback timing indicator field value indicating the same slot for PUCCH transmission, the UE detects it, and is based on a PUCCH resource indicator field for the last DCI format 3_0, among DCI format 3_0s related to transmitting the corresponding HARQ-ACK information in a PUCCH in which a DCI format detected by a UE for PUCCH resource determination is indexed in ascending order over PDCCH monitoring occasion indexes.

A UE does not expect to multiplex HARQ-ACK information about one or more SL configuration grants among the same PUCCH.

A priority value of PUCCH transmission including one or more sidelink HARQ-ACK information bits is a minimum priority value for one or more HARQ-ACK information bits. Hereinafter, a CRC for DCI format 3_0 is scrambled to SL-RNTI or SL-CS-RNTI.

An SL DRX configuration referred to in this disclosure may include at least one or more of the following parameters.

For example, an SL DRX configuration may include one or more of the information listed below.

(1) For example, SL drx-onDurationTimer may be information on the duration at the beginning of a DRX Cycle. For example, a start period of a DRX cycle may be information on a period in which a terminal operates in an active mode to transmit or receive sidelink data.

(2) For example, SL drx-SlotOffset may be information on a delay before starting a drx-onDurationTimer of a DRX-on duration timer.

(3) For example, SL drx-Inactivity Timer may be information on the duration after the PSCCH occasion in which a PSCCH indicates a new sidelink transmission and reception for the MAC entity. For example, when a transmitting terminal instructs PSSCH transmission through a PSCCH, the transmitting terminal operates in an active mode while an SL drx-Inactivity Timer is running, so that the transmitting terminal may transmit PSSCH to a receiving terminal. Also, for example, when a receiving terminal is instructed that a transmitting terminal transmits a PSSCH through PSCCH reception, the receiving terminal operates in an active mode while SL drx-Inactivity Timer is running, so that the receiving terminal may receive the PSSCH from the transmitting terminal.

(4) For example, SL drx-RetransmissionTimer may be information on the maximum duration until a retransmission is received. For example, SL drx-Retransmission Timer may be configured per HARQ process.

(5) For example, SL drx-HARQ-RTT-Timer may be information on the minimum duration before an assignment for HARQ retransmission is expected by the MAC entity. For example, SL drx-HARQ-RTT-Timer may be configured per HARQ process.

(6) For example, SL drx-LongCycleStartOffset may be information on the Long DRX cycle and drx-StartOffset which defines the subframe where the Long and Short DRX Cycle starts.

(7) For example, SL drx-ShortCycle may be information on the Short DRX cycle. For example, SL drx-ShortCycle may be optional information.

(8) For example, SL drx-ShortCycleTimer may be information on the duration a UE shall follow the Short DRX cycle. For example, SL drx-ShortCycleTimer may be optional information.

(9) For example, SL drx-StartOffset may be information about the subframe where the SL DRX cycle starts.

(10) For example, SL drx-Cycle may be information about the SL DRX cycle.

The following SL DRX timer mentioned in this disclosure may be used for the following purposes.

(1) SL DRX on-duration timer: A period in which a UE performing an SL DRX operation should basically operate in an active time to receive a counterpart UE's PSCCH/PSSCH.

(2) SL DRX inactivity timer: A period in which a UE performing an SL DRX operation extends an SL DRX on-duration period, which is a period in which an active time is basically required to receive PSCCH/PSSCH of a counterpart UE.

For example, a UE may extend an SL DRX on-duration timer by an SL DRX inactivity timer period. Also, when a UE receives a new packet (e.g., new PSSCH transmission) from a counterpart UE, the UE may start an SL DRX inactivity timer to extend the SL DRX on-duration timer.

For example, an SL DRX inactivity timer may be used to extend an SL DRX duration timer period, which is a period in which an RX UE performing an SL DRX operation should basically operate as an active time to receive a PSCCH/PSSCH of the other TX UE. That is, an SL DRX on-duration timer may be extended by an SL DRX inactivity timer period. In addition, when an RX UE receives a new packet (e.g., new PSSCH transmission) from a counterpart TX UE, the RX UE may start an SL DRX inactivity timer to extend the SL DRX on-duration timer.

(3) SL DRX HARQ RTT timer: A period in which a UE performing an SL DRX operation operates in a sleep mode until it receives a retransmission packet (or PSSCH assignment) transmitted by a counterpart UE.

For example, when a UE starts an SL DRX HARQ RTT timer, the UE may determine that a counterpart UE will not transmit a sidelink retransmission packet to it until the SL DRX HARQ RTT timer expires, and may operate in a sleep mode while the corresponding timer is running. For example, when a UE starts an SL DRX HARQ RTT timer, the UE may not monitor sidelink retransmission packets from a counterpart UE until the SL DRX HARQ RTT timer expires. For example, when an RX UE that has received a PSCCH/PSSCH transmitted by a TX UE transmits SL HARQ NACK feedback, the RX UE may start an SL DRX HARQ RTT timer. In this case, an RX UE may determine that a counterpart TX UE will not transmit a sidelink retransmission packet to it until an SL DRX HARQ RTT timer expires, and the RX UE may operate in a sleep mode while the corresponding timer is running.

(4) SL DRX retransmission timer: A timer that starts when an SL DRX HARQ RTT timer expires, and a period in which a UE performing SL DRX operation operates as an active time to receive a retransmission packet (or PSSCH assignment) transmitted by a counterpart UE.

For example, during the corresponding timer period, a UE may receive or monitor a retransmission sidelink packet (or PSSCH assignment) transmitted by a counterpart UE. For example, an RX UE may receive or monitor a retransmission sidelink packet (or PSSCH assignment) transmitted by a counterpart TX UE while an SL DRX retransmission timer is running.

The following Uu DRX timer mentioned in this disclosure may be used for the following purposes.

(1) Uu DRX HARQ RTT TimerSL

For example, the Uu DRX HARQ RTT TimerSL can be used in a period in which the UE performing the Uu DRX operation does not have to monitor DCI (PDCCH) for SL Mode 1 operation transmitted by the base station. That is, while the Uu DRX HARQ RTT TimerSL is operating, the UE may not need to monitor the PDCCH for SL Mode 1 operation. In other words, Uu DRX HARQ RTT TimerSL may mean a minimum duration before an SL retransmission grant is expected.

(2) Uu DRX Retransmission TimerSL

For example, it can be used in a period in which a UE performing a Uu DRX operation monitors DCI (PDCCH) for SL Mode 1 operation transmitted by a base station. That is, while Uu DRX Retransmission TimerSL is in operation, the UE can monitor the PDCCH transmitted by the base station for SL Mode 1 operation. In other words, Uu DRX Retransmission TimerSL may mean a maximum duration until an SL retransmission grant is received.

Figure 8:
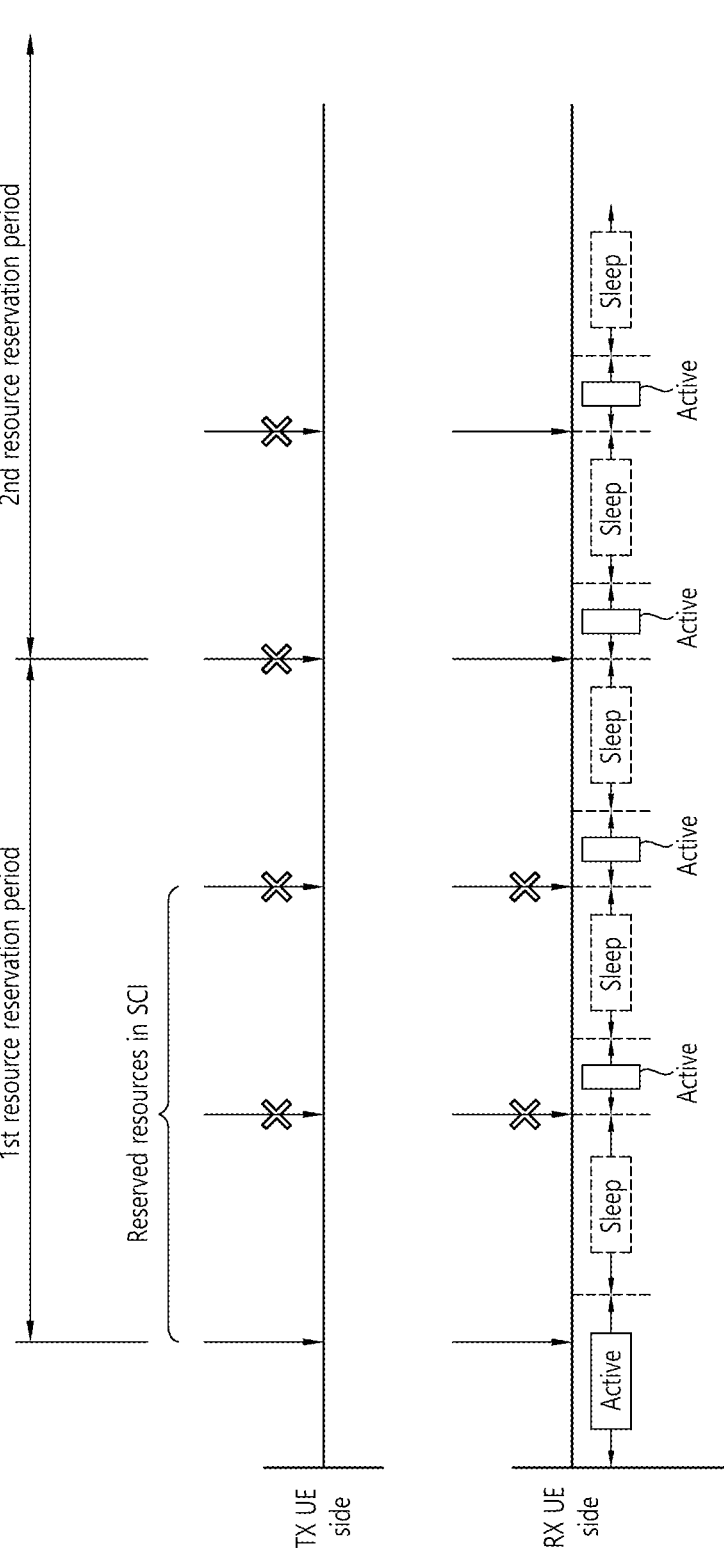
FIG. 8 is a drawing that describes a problem with a method of performing SL DRX operation, based on an embodiment of the present disclosure.

FIG. 8 is a drawing that describes a problem with a method of performing SL DRX operation, based on an embodiment of the present disclosure. FIG. 8 may be combined with various embodiments of the present disclosure.

Referring to FIG. 8, an embodiment of the present disclosure, for example, TX UE may transmit SCI indicating or representing a first transmission resource (for example, first SCI) to a RX UE. For example, the SCI may include a transmission resource information related to a first transmission resource, a second transmission resource, and a third transmission resource (for example, information for time resource assignment). For example, the SCI may include information related to a resource reservation period. For example, the SCI may include transmission resource information related to a transmission resource within the resource reservation period (For example, the Nth transmission resource within the Mth period, M and N may be more than or equal to 1). For example, RX UE may complete receiving the SCI transmitted by the TX UE within the current resource reservation period (For example, first resource reservation period) and within active time of the RX UE. For example, based on the transmission resource information included in the SCI, RX UE may obtain transmission resource information for the PSSCH that is transmitted in association with first SCI and transmission resource information for next transmission. For example, RX UE may expect when the TX UE will perform second transmission and/or third transmission based on the completion of the reception of the SCI. For example, RX UE that is performing SL DRX operation may perform sleep operation from the time of completion of reception of the SCI to the expected time when the next transmission resource will appear, may not perform monitoring operation for the PSCCH/PSSCH being transmitted by the TX UE. Additionally, for example, the RX UE may wake-up in next transmission resource location included in the SCI, the RX UE may monitor or receive PSCCH/PSSCH transmitted by TX UE n next transmission resource location included in the SCI. For example, the RX UE may obtain the transmission resource information where PSSCH, associated with received SCI in the second transmission resource, is transmitted (For example, second transmission resource information), and the transmission resource information for next transmission (For example, third transmission resource information, fourth transmission resource information).

Furthermore, for example, based on the information related to resource reservation period, RX UE may monitor/ receive PSCCH/PSSCH transmitted by the TX UE in transmission resource location (For example, the first transmission resource, the second transmission resource, and third transmission resource within the second resource reservation interval) that is expected within the next resource reservation period (For example, second resource reservation period).

For example, the TX UE may reselect a resource or may not transmit during a periodic reservation resource time (For example, SL grant generated for the transmission of multiple MAC PDUs). For example, the TX UE may reselect a resource due to reasons such as pre-emption, re-evaluation, and reprioritization of the TX UE. For example, the TX UE may not transmit due to reasons such as a uplink (UL)-SL prioritization, long term evolution (LTE) SL-new radio (NR) SL prioritization, and congestion control. For example, if the TX UE reselect a resource or not transmit in time of periodic reservation resource of current period (For example, first resource reservation period), the TX UE may not transmit a new packet additionally in time of periodic reservation resource of the subsequent period (For example, ith resource reservation period larger than first resource reservation period). Conversely, if the TX UE reselect a resource or not transmit in a time of aperiodic reservation resource (For example, the SL grant generated for the transmission of the single MAC PDU), TX UE may transmit a new packet additionally in the subsequent time of the aperiodic reservation resource.

Therefore, for example, RX UE may unnecessarily perform SL DRX operation based on resource information, for periodic traffic. For example, by unnecessarily performing monitoring operation for expected transmission for period traffic (For example, ith resource reservation period larger than first resource reservation period) by the RX UE, the power of the RX UE may be wasted. For example, monitoring of the RX UE may not be performed effectively for a plurality of transmissions expected for aperiodic traffic (for example, the subsequent time of the aperiodic reservation resource).

Figure 9:
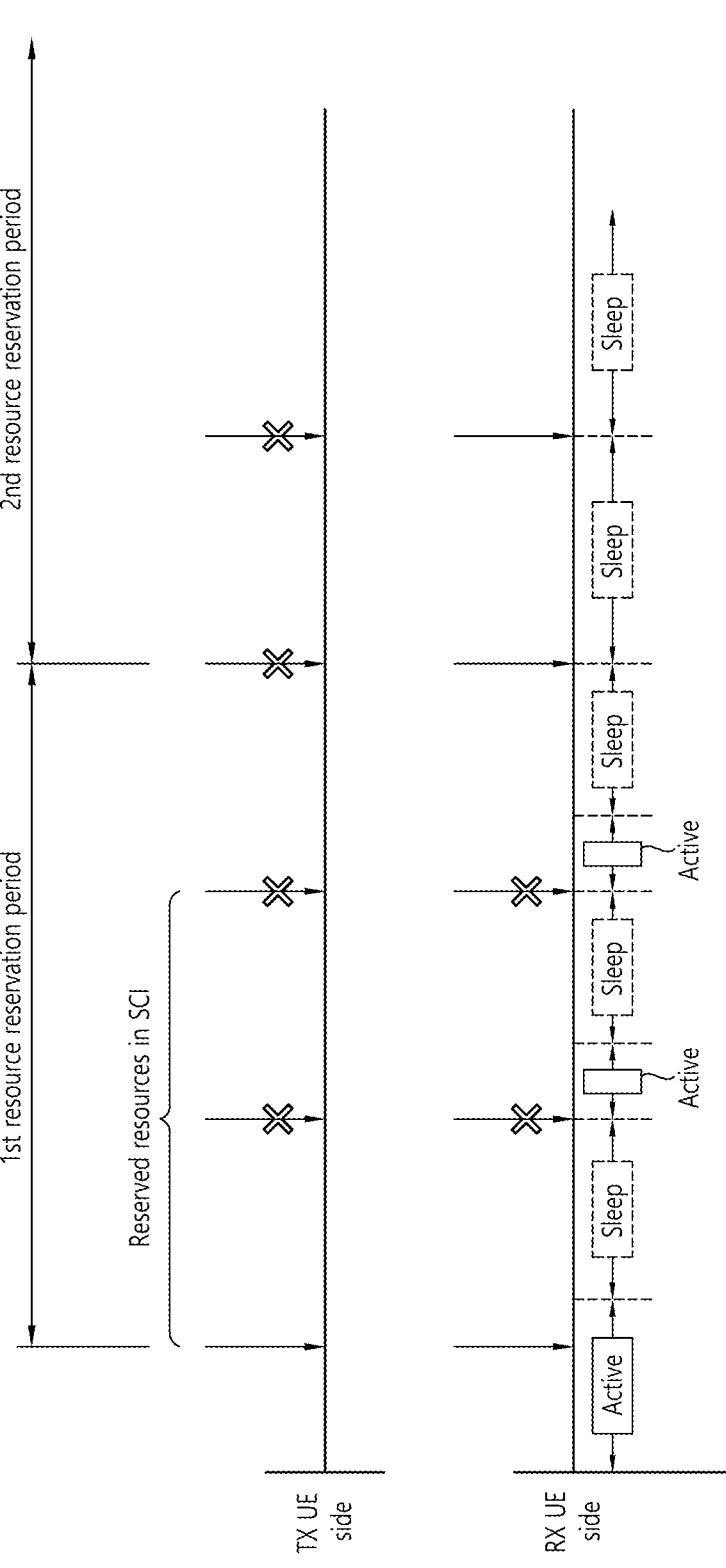
FIG. 9 is a drawing that describes a method of performing SL DRX operation, based on an embodiment of the present disclosure.

FIG. 9 is a drawing that describes a method of performing SL DRX operation, based on an embodiment of the present disclosure. FIG. 9 may be combined with various embodiments of the present disclosure.

Referring to FIG. 9, an embodiment according to the present disclosure, for example, TX UE transmit the SCI indicating or representing a first transmission resource (for example, first SCI) to the RX UE. For example, the SCI may include the transmission resource information related to the first transmission resource, the second transmission resource, and the third transmission resource (For example, information for time resource assignment). For example, the SCI may include information related to a resource reservation period. For example, the SCI may include transmission resource information related to a transmission resource within the resource reservation period (For example, the Nth transmission resource within the Mth period, M and N may be more than or equal to 1). For example, RX UE may complete receiving the SCI transmitted by the TX UE within the current resource reservation period (For example, first resource reservation period) and within active time of the RX UE. For example, based on the transmission resource information included in the SCI, RX UE may obtain transmission resource information for the PSSCH that is transmitted in association with first SCI and transmission resource information for next transmission. For example, RX UE may expect when the TX UE will perform second transmission and/or third transmission based on the completion of the reception of the SCI. For example, RX UE that is performing SL DRX operation may perform sleep operation from the time of completion of reception of the SCI to the expected time when the next transmission resource will appear, may not perform monitoring operation for the PSCCH/PSSCH being transmitted by the TX UE. Additionally, for example, the RX UE may wake-up in next transmission resource location included in the SCI, the RX UE may monitor or receive PSCCH/PSSCH transmitted by TX UE n next transmission resource location included in the SCI. For example, the RX UE may obtain the transmission resource information where PSSCH, associated with received SCI in the second transmission resource, is transmitted (For example, second transmission resource information), and the transmission resource information for next transmission (For example, third transmission resource information, fourth transmission resource information).

For example, the RX UE may not receive SCI in the N resources (For example, two resources) from the TX UE. For example, the RX UE may not receive SCI in in the N resources (For example, two resources) from the TX UE due to resource reselection by TX UE or not transmit by TX UE. For example, the RX UE may determine a resource after N resources (For example, two resources) as not-valid resource.

Furthermore, for example, the RX UE may determine periodic reservation resource (For example, jth transmission resource more than or equal to ith resource reservation period, where ith is larger than first) after N resources (For example, two resources) as not-valid resource. For example, the RX UE may not perform monitoring operation in a time of periodic reservation resource being after the N resources (For example, two resources). For example, based on the information related to the resource reservation period, the RX UE may not wake up in the transmission resource location (For example, first transmission resource, second transmission resource, and third transmission resource) is expected within the next resource reservation period (For example, second resource reservation period). For example, the RX UE may not monitor/receive PSCCH/PSSCH being transmitted by the TX UE in the transmission resource location (For example, first transmission resource, second transmission resource, and third transmission resource) is expected within the next resource reservation period (For example, second resource reservation period).

Therefore, for example, the TX UE may not unnecessarily perform the SL DRX operation based on resource information additionally for the periodic traffic. For example, The RX UE may not perform monitoring operation unnecessarily for transmission being expected for periodic traffic (For example, the transmission within ith resource reservation period being larger than that of first resource). For example, by not performing the monitoring operation unnecessarily for transmission being expected for periodic traffic (For example, the transmission within ith resource reservation period being larger than that of first resource) by the RX UE, the power of the RX UE may not be wasted. For example, the monitoring of the RX UE is performed effectively for a plurality of transmissions being expected for periodic traffic (For example, the transmission within ith resource reservation period being larger than that of first resource).

Figure 10:
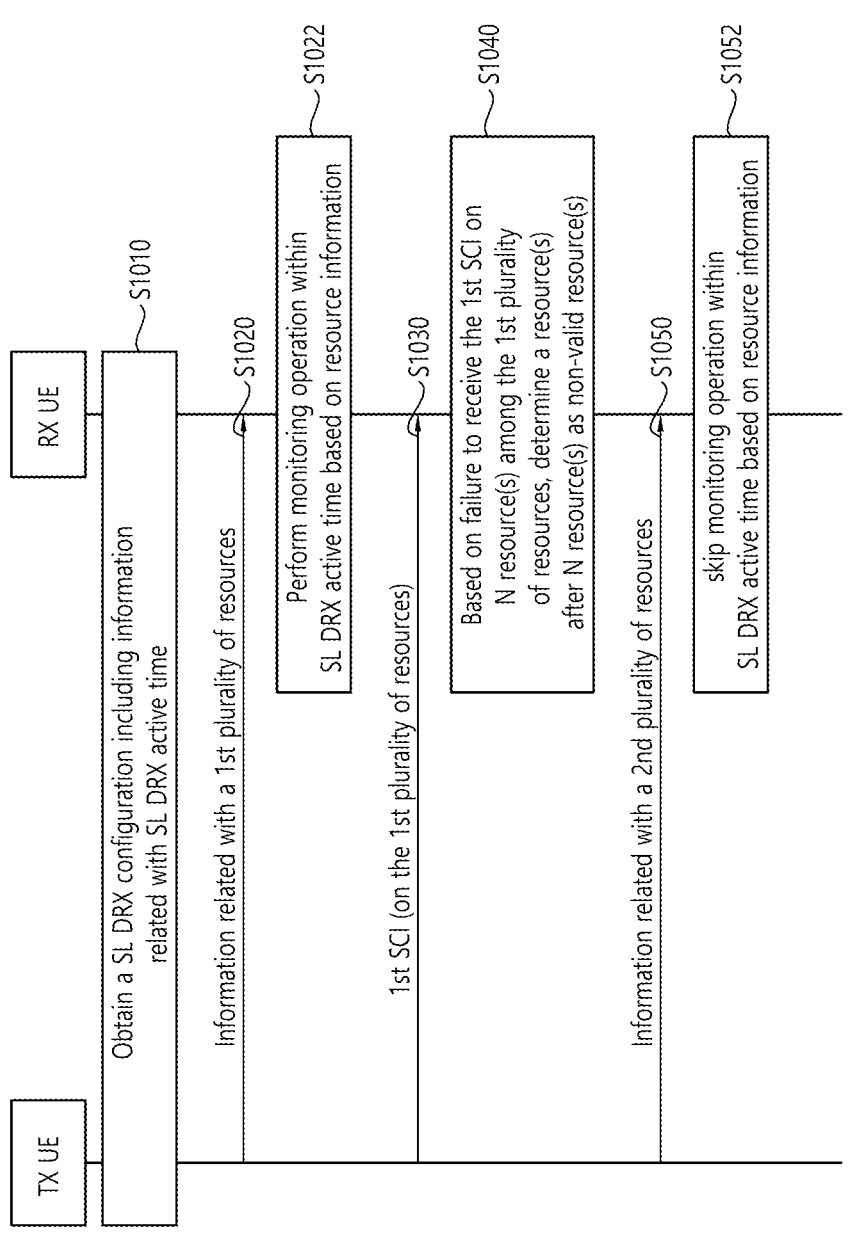
FIG. 10 is a drawing that describes a procedure of performing SL DRX operation, based on an embodiment of the present disclosure.

FIG. 10 is a drawing that describes a procedure of performing SL DRX operation, based on an embodiment of the present disclosure. FIG. 10 may be combined with various embodiments of the present disclosure.

Referring to FIG. 10, in step S1010, the TX UE and/or the RX UE may sidelink (SL) discontinuous reception (DRX) configuration including information related to SL DRX active time of the first device. For example, the TX UE may transmit SL DRX configuration to the RX UE based on the PC5-RRC connection. In step S1020, for example, the TX UE may transmit information related to the plurality of first resources to the RX UE. For example, the plurality of first resources may include includes information related to a frequency resource of the plurality of first resources and information related to a time resource of the plurality of first resources. In step S1022, for example, the RX UE may perform a monitoring operation within SL DRX active time based on resource information. For example, the RX UE may wake up/monitor for receiving PSCCH/PSSCH within a time domain of the plurality of first resources. In step S1030, for example, the TX UE may transmit the first SCI to the RX UE on the plurality of first resources. In step S1040, for example, based on not receiving the first SCI from the TX UE on N resources among the plurality of first resources, the RX UE, may determine a resource after the N resources as a non-valid resource. In step S1050, for example, the TX UE may transmit information related to the plurality of second resources to the RX UE. In step S1052, for example, the TX UE may not perform the monitoring operation within the SL DRX active time based on resource information. For example, the TX UE may not perform (omit, for example, skip) the monitoring operation within the SL DRX active time based on resource information.

According to an embodiment of the present disclosure, SL DRX operation may be supported in Release 17 NR V2X.

In an embodiment of the present disclosure, for the power saving operation of the RX UE performing the sidelink DRX operation, the SL DRX timer may be operated based on the mode 2 periodic resource reservation of the TX UE.

According to an embodiment of the present disclosure, regardless of the periodic traffic or aperiodic traffic, when the TX UE receives new TB from the TX UE, the RX UE may (re)start the SL DRX inactivity timer. Furthermore, for example, regardless of the periodic traffic or aperiodic traffic, when the TX UE transmit the new TB to the RX UE, the RX UE may (re)start the SL DRX inactivity timer.

According to an embodiment of the present disclosure, for example, when the TX UE performed the resource reservation through periodic reservation resource (For example, the SL grant generated for the transmission of the multiple MAC PDU) through the SCI, the periodic reservation resource interval may occur within the SL DRX onduration timer of the RX UE. For example, when the periodic reservation resource interval occurred within the SL DRX onduration timer of the RX UE may receive the TB in the time of the periodic reservation resource. For example, when the RX UE receives the TB in the time of the periodic reservation resource, the TX UE may not restart SL DRX inactivity timer (For example, the user equipment (for example, the RX UE) just wakes up in periodic reservation resource interval, the user equipment may monitor the PSCCH/PSSCH of the TX UE). For example, when the RX UE receives the MAC PDU within SL DRX onduration timer and in aperiodic reservation resource reserved through the SCI by the TX UE (For example, the SL grant generated for the transmission of the single MAC PDU), the RX UE may start the SL DRX inactivity timer (For example, start for monitoring the additional new TB transmitted from the time of the aperiodic reservation resource). For example, after the SL DRX timer started by the received TB (For example, or the MAC PDU) in the time of the aperiodic reservation resource is expired, the RX UE may wake up if periodic reservation resource interval occur in the DRX off period (for example, an interval other an the active time), for example, the TX UE may monitor the PSCCH/PSSCH transmitted by the TX UE.

According to an embodiment of the present disclosure, for example, if the TX UE reserves resource through the periodic reservation resource through the SCI, if the RX UE receives the new TB in the SL DRX onduration timer and the time of the periodic resource reservation, the RX UE (re) start the SL DRX inactivity timer per upon reception, for example, the RX UE may finally adapt the SL DRX inactivity timer started in a time nearest for time of the expiration of the SL DRX onduration timer. For example, if the RX UE receives the new TB in the started SL DRX inactivity timer, the SL DRX inactivity timer is not (re)started (For example, the SL DRX inactivity timer extended in the SL DRX onduration timer may be used only once). For example, if the TX UE reserves the resource through the periodic reservation resource, the TX UE may wake up in the periodic reservation resource interval, for example, the RX UE may perform monitoring in the periodic reservation resource interval. Furthermore, for example, the RX UE may assume (for example, expect) that the new TB (for example, the new TB transmitted by the TX UE) may be transmitted as much as possible within the SL DRX onduration timer according to the SL DRX cycle/SL DRX onduration timer (For example, the SL DRX cycle/SL DRX onduration timer configured according to the service/quality of service (QOS)). For example, the RX UE may assume (for example, expect) that the new TB (for example, the new TB transmitted by the TX UE) may be transmitted as much as possible within the SL DRX onduration timer according to the SL DRX cycle/SL DRX onduration timer (For example, the SL DRX cycle/SL DRX onduration timer configured according to the service/quality of service (QOS)) and may perform the SL DRX operation. For example, the RX UE may drop (or dropping) the received TB (For example, or MAC PDU) in a time of the aperiodic reservation resource of the off duration (For example, an interval other than the active time). For example, the RX UE may cancel (or cancelling) the TB (For example, or MAC PDU) monitoring operation (For example, the PSCCH/PSSCH monitoring). Furthermore, for example, for more obtaining the power saving gain, in one DRX cycle, the RX UE may start the SL DRX inactivity timer only once for the received TB in onduration timer interval, may not restart the SL DRX inactivity timer due to the newly received TB within the SL DRX onduration timer. For example, if the RX UE receives the new TB in the SL DRX onduration timer of the next DRX cycle, the SL DRX inactivity timer may be started by once, for example, the SL DRX inactivity timer may not be restarted due to the newly received TB in the SL DRX onduration timer According to an embodiment of the present disclosure, for example, if the RX UE receives the TB in the active time extended by the SL DRX inactivity timer and in the time of the aperiodic resource reservation, the RX UE (For example, exceptionally) may restart the inactivity timer.

According to an embodiment of the present disclosure, for example, the available number of re-starts of the SL DRX inactivity timer restarting the RX UE due to the TB in the time of the periodic resource reservation may be pre-configured (pre configuration).

According to an embodiment of the present disclosure, for example, if the resource is reselected due to the pre-emption of if the TX UE in the time of the periodic resource reservation, or the TX UE (For example, due to the uplink (UL)-sidelink (SL)/long term evolution (LTE) the SL-new radio (NR) SL prioritization, the congestion control) not transmitted, or if the RX UE does not received the SCI due to the failure of the PSSCH decoding transmitted by the TX UE, the following operations may be performed. 1) and 2) may be implemented with/without the embodiment of the present disclosure individually or simultaneously.

1) may be woken up in the time of the next (For example, periodic) reservation resource, for example, the PSCCH/PSSCH monitoring operation is performed of the TX UE in the time of the next (For example, periodic) reservation resource.

2) if the SCI is not received for more than the N times (For example, or all the SCI (For example, max 3 times) is missed (missing) in the time of the next (For example, periodic) reservation resource) in the time of the next (For example, periodic) reservation resource (For example, within the period, or through the period), the monitoring operation in the time of the next (For example, periodic) reservation resource is not performed. For example, if the SCI is not received for more than the N times (For example, or all the SCI (For example, max 3 times) is missed (missing) in the time of the next (For example, periodic) reservation resource) in the time of the next (For example, periodic) reservation resource (For example, within the period, or through the period), the resource in the time of the reservation resource (For example, periodic) may be considered (For example, determined) as non-valid resource.

An embodiment of the present disclosure may have various effects. For example, by the SL DRX operation based on the unnecessary resource information being not additionally performed, the monitoring operation of the RX UE related to expected transmission related to the periodic traffic can be reduced. For example, according to an embodiment of the present disclosure, by the SL DRX operation based on the unnecessary resource information being not additionally performed, the power according to the monitoring operation of the RX UE may be saved. For example, according to an embodiment of the present disclosure, by considering the unnecessary resources as the non-valid, the monitoring operation of the RX UE related to expected transmission related to the aperiodic traffic can be increased. For example, an embodiment of the present disclosure, by considering the unnecessary resources as the non-valid, the effectiveness of the monitoring operation can be enhanced.

According to an embodiment of the present disclosure, for example, if the TX UE performed the resource reservation through the periodic reservation resource through the SCI, the RX UE may (re)start the SL DRX inactivity timer only for the TB received from the time of the 1st reservation resource (For example, the 1st resource indicated by the SCI in the 1st period) in the 1st period in the time of the periodic reservation resource. For example, for the TB received in the resource reserved through the remaining periodic reservation resource, the RX UE may restart the SL DRX inactivity timer.

According to an embodiment of the present disclosure, for example, if the TX UE performed the resource reservation through the periodic reservation resource through the SCI, the TX UE may (re)start the SL DRX inactivity timer only for the TB transmitted from the time of the 1st reservation resource (For example, the at most three resources indicated by the SCI in the 1st period) in the 1st period in the time of the periodic reservation resource. For example, for the TB transmitted in the resource reserved through the remaining periodic reservation resource, the TX UE may restart the SL DRX inactivity timer.

According to an embodiment of the present disclosure, for example, if the TX UE performed the resource reservation through the periodic reservation resource through the SCI, the RX UE may (re)start the SL DRX inactivity timer only for the TB received from the time of the 1st reservation resource (For example, the at most three resources indicated by the SCI in the 1st period) in the 1st period in the time of the periodic reservation resource. For example, for the TB received in the resource reserved through the remaining periodic reservation resource, the RX UE may restart the SL DRX inactivity timer.

According to an embodiment of the present disclosure, for example, if the TX UE performed the resource reservation through the periodic reservation resource through the SCI, the TX UE may (re)start the SL DRX inactivity timer only for the TB transmitted from the time of the 1st reservation resource (For example, the 1st resource indicated by the SCI in the 1st period) in the 1st period in the time of the periodic reservation resource. For example, for the TB transmitted in the resource reserved through the remaining periodic reservation resource, the TX UE may restart the SL DRX inactivity timer.

According to an embodiment of the present disclosure, for example, if the TX UE performed the resource reservation through the periodic reservation resource through the SCI, the RX UE may (re)start the SL DRX inactivity timer for the TB (For example, or the MAC PDU) received from the time of the periodic reservation resource.

According to an embodiment of the present disclosure, for example, if the TX UE performed the resource reservation through the periodic reservation resource through the SCI, the TX UE may (re)start the SL DRX inactivity timer for the TB (For example, or the MAC PDU) transmitted from the time of the periodic reservation resource.

According to an embodiment of the present disclosure, for example, in view of the RX UE, the re-start of the SL DRX inactivity timer may be applied per different SL grant (For example, per L1 (layer 1) or L2 (layer 2) source/destination ID, or per SL process, etc). Further, for example, the RX UE may restart SL DRX inactivity timer not based on the MAC PDU reception but based on the reserved resource (For example, the TX UE may restart the SL DRX timer not based on the MAC PDU transmission but based on the reserved resource. For example, start the SL DRX inactivity timer in the time of the reserved resource. For example, an embodiment of the present disclosure may be applied with/without the embodiment of the other present disclosure individually or simultaneously.

In an embodiment of the present disclosure, the SL DRX retransmission timer (For example, or the SL DRX timer operating as the active time) or the SL DRX timer operating as inactivity time may be applied/extended other than the operation of the SL DRX inactivity timer.

In an embodiment, the name of the timer (Sidelink DRX Onduration Timer, Sidelink DRX Inactivity Timer, Sidelink DRX HARQ RTT Timer, Sidelink DRX Retransmission Timer, Uu DRX HARQ RTT TimerSL, Uu DRX Retransmission TimerSL, etc) is illustrative, timer performing identical/similar features based on the content described of each timer is considered identical/similar timer regardless of the name.

The proposal of the present disclosure may be extended and applied to parameters (e.g., timers) included in UE-pair specific SL DRX configuration, UE-pair specific SL DRX pattern, or UE-pair specific SL DRX configuration, in addition to parameters (e.g. timers) included in default/common SL DRX configuration, default/common SL DRX patterns, or default/common SL DRX configuration.

In addition, an on-duration mentioned in the proposal of the present disclosure can be extended and interpreted as an active time period (e.g., time to wake-up state (e.g., RF module turned on) to receive/transmit radio signals), an off-duration may be extended and interpreted as a sleep time (e.g., a time for operating in a sleep mode state (e.g., a state in which an RF module is turned off) for power saving). It does not mean that a TX UE is obligated to operate in a sleep mode in a sleep time interval. If necessary, a TX UE may be allowed to operate in an active time for a while for a sensing operation and/or a transmission operation even in sleep time.

For example, whether the (part of) proposed method/rule of the present disclosure is applied and/or a related parameter (e.g., threshold) may be configured specifically (or differently or independently) for a resource pool. For example, whether the (part of) proposed method/rule of the present disclosure is applied and/or a related parameter (e.g., threshold) may be configured specifically (or differently or independently) for congestion level. For example, whether the (part of) proposed method/rule of the present disclosure is applied and/or a related parameter (e.g., threshold) may be configured specifically (or differently or independently) for a priority of a service. For example, whether the (part of) proposed method/rule of the present disclosure is applied and/or a related parameter (e.g., threshold) may be configured specifically (or differently or independently) for a service type. For example, whether the (part of) proposed method/rule of the present disclosure is applied and/or a related parameter (e.g., threshold) may be configured specifically (or differently or independently) for a QoS requirement (e.g., latency, reliability). For example, whether the (part of) proposed method/rule of the present disclosure is applied and/or a related parameter (e.g., threshold) may be configured specifically (or differently or independently) for PQI(5QI(5G QoS identifier) for PC5). For example, whether the (part of) proposed method/rule of the present disclosure is applied and/or a related parameter (e.g., threshold) may be configured specifically (or differently or independently) for a traffic type (e.g., a periodic generation or a aperiodic generation). For example, whether the (part of) proposed method/rule of the present disclosure is applied and/or a related parameter (e.g., threshold) may be configured specifically (or differently or independently) for an SL transmission resource allocation mode (e.g., mode 1 or mode 2).

For example, whether the proposed rule of the present disclosure is applied and/or related parameter setting values may be configured specifically (or differently or independently) for a resource pool. For example, whether the proposed rule of the present disclosure is applied and/or related parameter setting values may be configured specifically (or differently or independently) for a type of service/packet. For example, whether the proposed rule of the present disclosure is applied and/or related parameter setting values may be configured specifically (or differently or independently) for a priority of service/packet. For example, whether the proposed rule of the present disclosure is applied and/or related parameter setting values may be configured specifically (or differently or independently) for QoS requirements (e.g., URLLC/EMBB traffic, reliability, latency). For example, whether the proposed rule of the present disclosure is applied and/or related parameter setting values may be configured specifically (or differently or independently) for PQI. For example, whether the proposed rule of the present disclosure is applied and/or related parameter setting values may be configured specifically (or differently or independently) for a cast type (e.g., unicast, groupcast, broadcast). For example, whether the proposed rule of the present disclosure is applied and/or related parameter setting values may be configured specifically (or differently or independently) for (resource pool) congestion level (e.g., CBR). For example, whether the proposed rule of the present disclosure is applied and/or related parameter setting values may be configured specifically (or differently or independently) for SL HARQ feedback scheme (e.g., NACK-only feedback, ACK/NACK feedback). For example, whether the proposed rule of the present disclosure is applied and/or related parameter setting values may be configured specifically (or differently or independently) for HARQ Feedback Enabled MAC PDU transmission. For example, whether the proposed rule of the present disclosure is applied and/or related parameter setting values may be configured specifically (or differently or independently) for HARQ Feedback Disabled MAC PDU transmission. For example, whether the proposed rule of the present disclosure is applied and/or related parameter setting values may be configured specifically (or differently or independently) for whether PUCCH-based SL HARQ feedback reporting operation is set. For example, whether the proposed rule of the present disclosure is applied and/or related parameter setting values may be configured specifically (or differently or independently) for a resource reselection based on pre-emption or pre-emption. For example, whether the proposed rule of the present disclosure is applied and/or related parameter setting values may be configured specifically (or differently or independently) for a re-evaluation or re-selection of resources based on re-evaluation.

For example, whether the proposed rule of the present disclosure is applied and/or related parameter setting values may be configured specifically (or differently or independently) for (L2 or L1) (source and/or destination) identifier. For example, whether the proposed rule of the present disclosure is applied and/or related parameter setting values may be configured specifically (or differently or independently) for (L2 or L1) (Combination of Source ID and Destination ID) Identifier. For example, whether the proposed rule of the present disclosure is applied and/or related parameter setting values may be configured specifically (or differently or independently) for (L2 or L1) (a combination of source ID and destination ID pair and cast type) identifier. For example, whether the proposed rule of the present disclosure is applied and/or related parameter setting values may be configured specifically (or differently or independently) for the direction of a pair of source layer ID and destination layer ID. For example, whether the proposed rule of the present disclosure is applied and/or related parameter setting values may be configured specifically (or differently or independently) for PC5 RRC connection/link. For example, whether the proposed rule of the present disclosure is applied and/or related parameter setting values may be configured specifically (or differently or independently) for the case of performing SL DRX. For example, whether the proposed rule of the present disclosure is applied and/or related parameter setting values may be configured specifically (or differently or independently) for SL mode type (e.g., resource allocation mode 1 or resource allocation mode 2). For example, whether the proposed rule of the present disclosure is applied and/or related parameter setting values may be configured specifically (or differently or independently) for a case of performing (a)periodic resource reservation.

The certain time referred to in the proposal of the present disclosure may refer to a time during which a UE operates as an active time for a predefined time in order to receive a sidelink signal or sidelink data from a counterpart UE. A certain time referred to in the proposal of the present disclosure may refer to a time during which a UE operates as an active time for a specific timer (e.g., a sidelink DRX retransmission timer, a sidelink DRX inactivity timer, or a timer that guarantees operation as active time in DRX operation of an RX UE) time in order to receive a sidelink signal or sidelink data from a counterpart UE. In addition, whether the proposal and proposal rule of the present disclosure are applied (and/or related parameter setting values) may also be applied to mmWave SL operation.

FIG. 11 shows a method for a first device to perform wireless communication, according to an embodiment of the present disclosure. The embodiment of FIG. 11 may be combined with various embodiments of the present disclosure.

Referring the FIG. 11, in step S1110, the first device may obtain sidelink (SL) discontinuous reception (DRX) configuration including information related to SL DRX active time of the first device. In step S1120, for example, the first device may receive, from a second device, information related to a plurality of resources. For example, the information related to the plurality of resources may include information related to a frequency resource of the plurality of resources and information related to a time resource of the plurality of resources. In step S1130, for example, the first device may perform a monitoring operation within SL DRX active time based on resource information. In step S1140, for example, based on not receiving, from the second device, first sidelink control information (SCI) through first physical sidelink control channel (PSCCH), for scheduling a first physical sidelink shared channel (PSSCH) and a second SCI, on N resources among the plurality of resources, the first device may determine a resource after the N resources as a non-valid resource. For example, N may be a positive integer.

Additionally or alternatively, based on that the resource after the N resources is the non-valid resource, the monitoring operation within the SL DRX active time based on the resource information may be skipped.

Additionally or alternatively, based on that the resource after the N resources is the non-valid resource, the first device may skip a monitoring operation within an active time related to the monitoring operation within the SL DRX active time based on the resource information.

Additionally or alternatively, the monitoring operation within the SL DRX active time based on the resource information may include a monitoring for reception of information transmitted from the second device on the plurality of resources.

Additionally or alternatively, the monitoring operation within the SL DRX active time based on the resource information may include the monitoring and a start of the SL DRX timer based on a success of a reception based on the monitoring.

Additionally or alternatively, the SL DRX timer may include at least one of SL DRX inactivity time or SL DRX retransmission timer.

Additionally or alternatively, the monitoring operation within the SL DRX active time based on the resource information may include the monitoring and a skipping of the start of the SL DRX timer based on a success of a reception based on the monitoring.

Additionally or alternatively, the information related to the plurality of resources may include information for a resource reservation period.

Additionally or alternatively, the N resources may be a resource within a first period among the resource reservation period.

Additionally or alternatively, based on that any of the first SCI is not received on the N resources, the resource after the N resources may be determined as the non-valid resource.

Additionally or alternatively, a time interval among the N resources the may be identical.

Additionally or alternatively, the N may be 3.

Additionally or alternatively, a resource related to the resource reservation period among the resource after the N resources may be determined as the non-valid resource.

Additionally or alternatively, M resources among the N resources are the resource within the first period.

Additionally or alternatively, M may be the positive integer, smaller than the N.

Additionally or alternatively, a resource after the M resources may be included in a second period next to the first period.

Additionally or alternatively, based on that the first SCI is not successfully received from the second device based on a resource reselection of the second device or a transmission drop of the second device, the resource after the N resources may be determined as the non-valid resource.

Additionally or alternatively, the resource reselection may be a resource reselection based on a resource reselection based on a re-evaluation or based on a resource reselection based on a pre-emption checking.

Additionally or alternatively, the transmission drop may be at least one of a transmission drop based on a uplink (UL)-SL prioritization or a transmission drop based on a congestion control.

Additionally or alternatively, based on that the first SCI is not successfully received from the second device based on a failure of a decoding of the first device, the resource after the N resources may be determined as the non-valid resource.

The proposed method may be applied to the device according to various embodiments of the present disclosure. First, the processor (102) of the first device (100) may obtain sidelink (SL) discontinuous reception (DRX) configuration including information related to SL DRX active time of the first device. For example, the processor (102) of the first device (100) may control transceiver (106) to receive, from a second device, information related to a plurality of resources. For example, the information related to the plurality of resources may include information related to a frequency resource of the plurality of resources and information related to a time resource of the plurality of resources. For example, the processor (102) of the first device (100) may control transceiver (106) to perform a monitoring operation within resource information-based SL DRX active time. For example, based on not receiving, from the second device, first sidelink control information (SCI) through first physical sidelink control channel (PSCCH), for scheduling a first physical sidelink shared channel (PSSCH) and a second SCI, on N resources among the plurality of resources, the processor (102) of the first device (100) may determine a resource after the N resources as a non-valid resource. For example, N may be a positive integer.

According to an embodiment of the present disclosure, the first device performing wireless communication may be provided. The first device comprising at least one memory storing instructions; at least one transceiver; and at least one processor connected to the at least one memory and the at least one transceiver, based on the instructions executed by the at least one processor, may obtain sidelink (SL) discontinuous reception (DRX) configuration including information related to SL DRX active time of the first device. For example, based on the instructions executed by the at least one processor, may receive, from a second device, information related to a plurality of resources. For example, the information related to the plurality of resources may include information related to a frequency resource of the plurality of resources and information related to a time resource of the plurality of resources. For example, based on the instructions executed by the at least one processor, may perform a monitoring operation within resource information-based SL DRX active time. For example, based on the instructions executed by the at least one processor, based on not receiving, from the second device, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

According to an embodiment of the present disclosure, the apparatus configured for control the first user equipment may be provided. The apparatus comprising at least one processor; and at least one memory executably connected by the at least one processor and storing instructions: based on the instructions executed by the at least one processor, the first user equipment, may obtain sidelink (SL) discontinuous reception (DRX) configuration including information related to SL DRX active time of the first user equipment. For example, based on the instructions executed by the at least one processor, the first user equipment, may receive, from a second user equipment, information related to a plurality of resources. For example, the information related to the plurality of resources may include information related to a frequency resource of the plurality of resources and information related to a time resource of the plurality of resources. For example, based on the instructions executed by the at least one processor, the first user equipment, may perform a monitoring operation within resource information-based SL DRX active time. For example, based on the instructions executed by the at least one processor, the first user equipment, based on not receiving, from the second user equipment, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

According to an embodiment of the present disclosure, a non-transitory computer-readable storage medium storing instructions may be provided. The instructions, when executed by at least one processor, cause the at least one processor to: obtain sidelink (SL) discontinuous reception (DRX) configuration including information related to SL DRX active time of the first device. For example, the instructions, when executed by at least one processor, cause the at least one processor to: receive, from a second device, information related to a plurality of resources. For example, the information related to the plurality of resources may include information related to a frequency resource of the plurality of resources and information related to a time resource of the plurality of resources. For example, the instructions, when executed by at least one processor, cause the at least one processor to: perform a monitoring operation within resource information-based SL DRX active time. For example, the instructions, when executed by at least one processor, cause the at least one processor: based on not receiving, from the second device, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

FIG. 12 shows a method for a second device to perform wireless communication according to an embodiment of the present disclosure. The embodiment of FIG. 12 may be combined with various embodiments of the present disclosure.

Referring the FIG. 12, In step S1210, the second device may obtain sidelink (SL) discontinuous reception (DRX) configuration including information related to SL DRX active time of the first device. In step S1220, the second device may transmit, to a first device, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. In step S1230, based on not transmitting, to the first device, first sidelink control information (SCI) through first physical sidelink control channel (PSCCH), for scheduling a first physical sidelink shared channel (PSSCH) and a second SCI, on N resources among the plurality of resources, the second device may determine a resource after the N resources as a non-valid resource. For example, N may be a positive integer.

Additionally or alternatively, based on that the resource after the N resources is the non-valid resource, the second device may skip the monitoring operation within the SL DRX active time based on the resource information.

Additionally or alternatively, the monitoring operation within the SL DRX active time based on the resource information may include a monitoring for reception of information transmitted from the second device on the plurality of resources.

Additionally or alternatively, the monitoring operation within the SL DRX active time based on the resource information may include the monitoring and a start of the SL DRX timer based on a success of a reception based on the monitoring.

Additionally or alternatively, the SL DRX timer may include at least one of SL DRX inactivity time or SL DRX retransmission timer.

Additionally or alternatively, the monitoring operation within the SL DRX active time based on the resource information may include the monitoring and a skipping of the start of the SL DRX timer based on a success of a reception based on the monitoring.

Additionally or alternatively, the information related to the plurality of resources may include information for a resource reservation period.

Additionally or alternatively, the N resources may be a resource within a first period among the resource reservation period.

Additionally or alternatively, based on that any of the first SCI is not received on the N resources, the resource after the N resources may be determined as the non-valid resource.

Additionally or alternatively, a time interval among the N resources the may be identical.

Additionally or alternatively, the N may be 3.

Additionally or alternatively, a resource related to the resource reservation period among the resource after the N resources may be determined as the non-valid resource.

Additionally or alternatively, M resources among the N resources are the resource within the first period.

Additionally or alternatively, M may be the positive integer, smaller than the N.

Additionally or alternatively, a resource after the M resources may be included in a second period next to the first period.

Additionally or alternatively, based on that the first SCI is not successfully transmitted to the first device based on a resource reselection of the second device or a transmission drop of the second device, the resource after the N resources may be determined as the non-valid resource.

Additionally or alternatively, the resource reselection may be a resource reselection based on a resource reselection based on a re-evaluation or based on a resource reselection based on a pre-emption checking.

Additionally or alternatively, the transmission drop may be at least one of a transmission drop based on a uplink (UL)-SL prioritization or a transmission drop based on a congestion control.

Additionally or alternatively, based on that the first SCI is not successfully transmitted to the first device based on a failure of a decoding of the first device, the resource after the N resources may be determined as the non-valid resource.

The proposed method may be applied to the device according to various embodiments of the present disclosure. First, the processor (202) of the second device (200) may obtain sidelink (SL) discontinuous reception (DRX) configuration including information related to SL DRX active time of the first device. For example, the processor (202) of the second device (200) may control the transceiver (206) to transmit, to a first device, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. For example, based on not transmitting, to the first device, first sidelink control information (SCI) through first physical sidelink control channel (PSCCH), for scheduling a first physical sidelink shared channel (PSSCH) and a second SCI, on N resources among the plurality of resources, the processor (202) of the second device (200) may determine a resource after the N resources as a non-valid resource. For example, N may be a positive integer.

According to an embodiment of the present disclosure, the second device performing wireless communication may be provided. The second device comprising at least one memory storing instructions: at least one transceiver; and at least one processor connected to the at least one memory and the at least one transceiver, based on the instructions executed by the at least one processor, may obtain sidelink (SL) discontinuous reception (DRX) configuration including information related to SL DRX active time of the first device. For example, based on the instructions executed by the at least one processor, may transmit, to a first device, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. For example, based on the instructions executed by the at least one processor, based on not transmitting, to the first device, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

According to an embodiment of the present disclosure, the apparatus configured for control the second user equipment may be provided. The apparatus comprising at least one processor; and at least one memory executably connected by the at least one processor and storing instructions: based on the instructions executed by the at least one processor, the second user equipment, may obtain sidelink (SL) discontinuous reception (DRX) configuration including information related to SL DRX active time of the first user equipment. For example, based on the instructions executed by the at least one processor, the second user equipment, may transmit, to a first user equipment, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. For example, based on the instructions executed by the at least one processor, the second user equipment, based on not transmitting, to the first user equipment, first sidelink control information (SCI) through first physical sidelink control channel (PSCCH), for scheduling a first physical sidelink shared channel (PSSCH) and a second SCI, on N resources among the plurality of resources, may determine a resource after the N resources as a non-valid resource. For example, N may be a positive integer.

According to an embodiment of the present disclosure, a non-transitory computer-readable storage medium storing instructions may be provided. The instructions, when executed by at least one processor, cause the at least one processor: the second device may obtain sidelink (SL) discontinuous reception (DRX) configuration including information related to SL DRX active time of the first device. The instructions, when executed by at least one processor, cause the at least one processor: the second device may transmit, to a first device, information related to a plurality of resources. For example, the information related to the plurality of resources may include information related to a frequency resource of the plurality of resources and information related to a time resource of the plurality of resources. For example, the information related to the plurality of resources may include information for performing a monitoring operation within SL DRX active time based on resource information. The instructions, when executed by at least one processor, cause the at least one processor: based on not transmitting, to the first device, first sidelink control information (SCI) through first physical sidelink control channel (PSCCH), for scheduling a first physical sidelink shared channel (PSSCH) and a second SCI, on N resources among the plurality of resources, the second device may determine a resource after the N resources as a non-valid resource. For example, N may be a positive integer.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
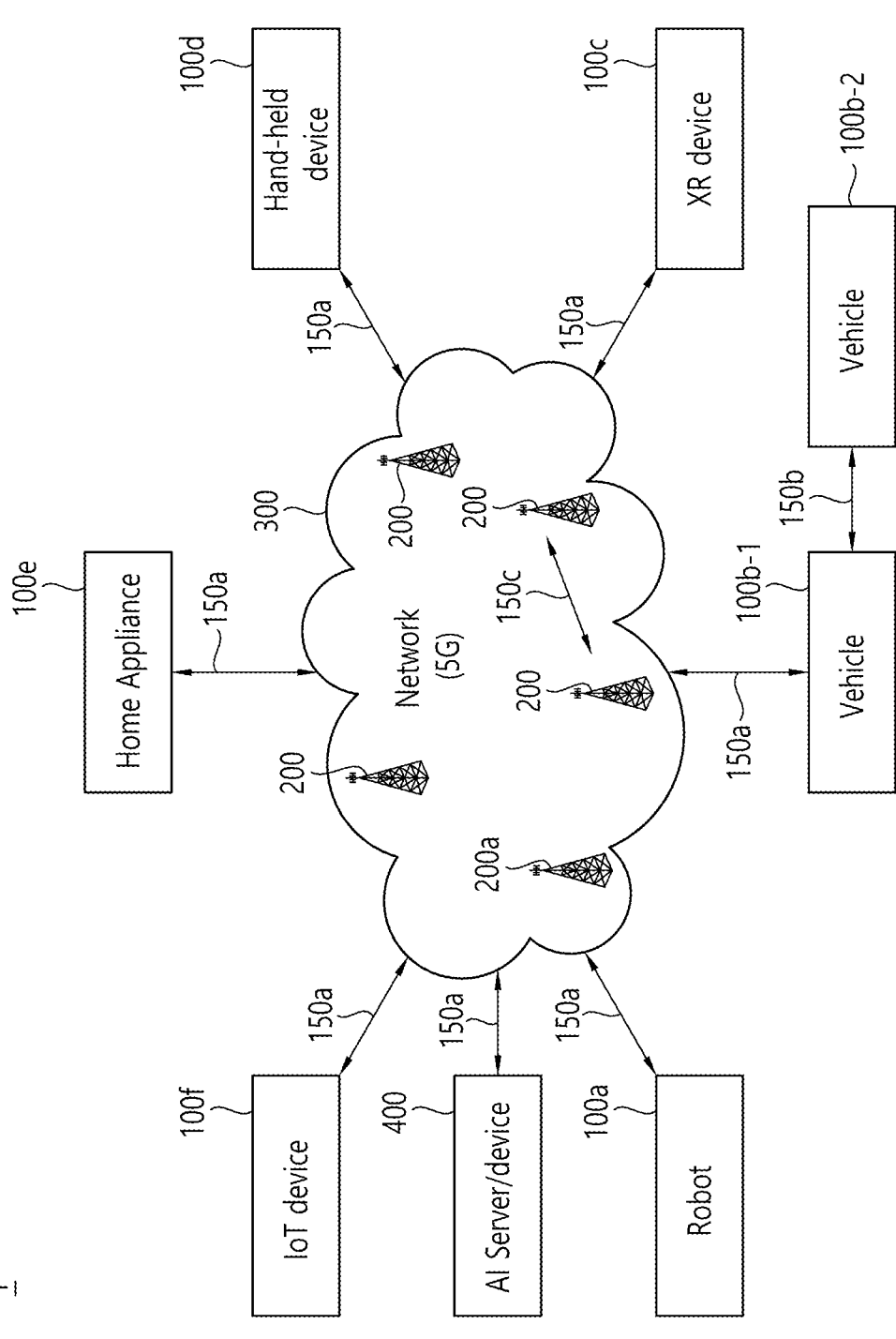
FIG. 13 shows a communication system 1, based on an embodiment of the present disclosure.

FIG. 13 shows a communication system 1, based on an embodiment of the present disclosure. The embodiment of FIG. 13 may be combined with various embodiments of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
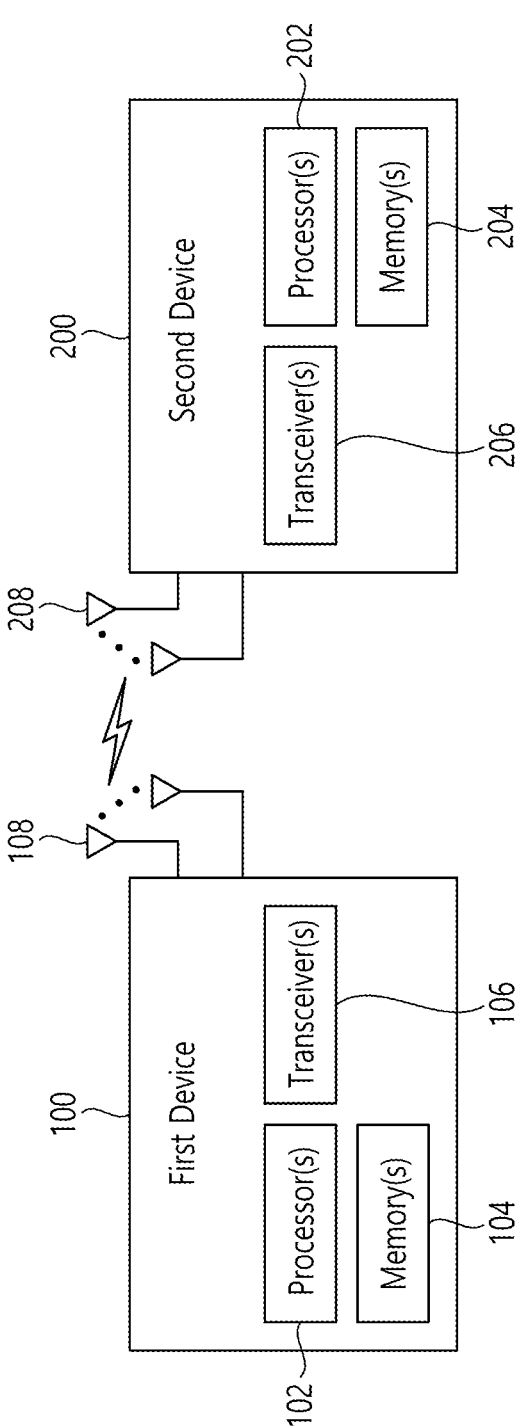
FIG. 14 shows wireless devices, based on an embodiment of the present disclosure.

FIG. 14 shows wireless devices, based on an embodiment of the present disclosure. The embodiment of FIG. 14 may be combined with various embodiments of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and at least one memory 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and at least one memory 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document.

Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
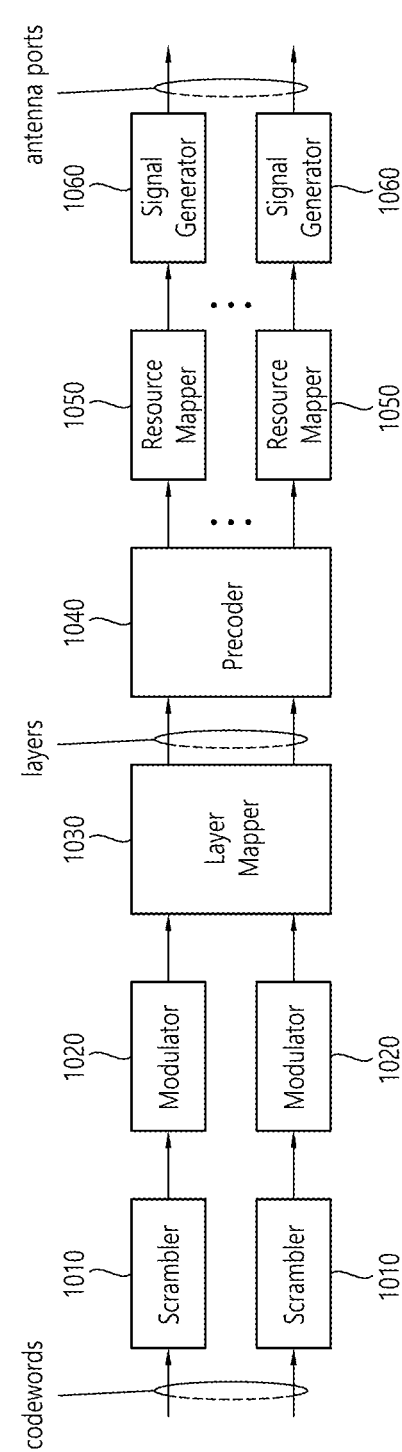
FIG. 15 shows a signal process circuit for a transmission signal, based on an embodiment of the present disclosure.

FIG. 15 shows a signal process circuit for a transmission signal, based on an embodiment of the present disclosure. The embodiment of FIG. 15 may be combined with various embodiments of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 16 shows another example of a wireless device, based on an embodiment of the present disclosure. The wireless device may be implemented in various forms according to a use-case/service (refer to FIG. 13). The embodiment of FIG. 16 may be combined with various embodiments of the present disclosure.

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 17 may be combined with various embodiments of the present disclosure.

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
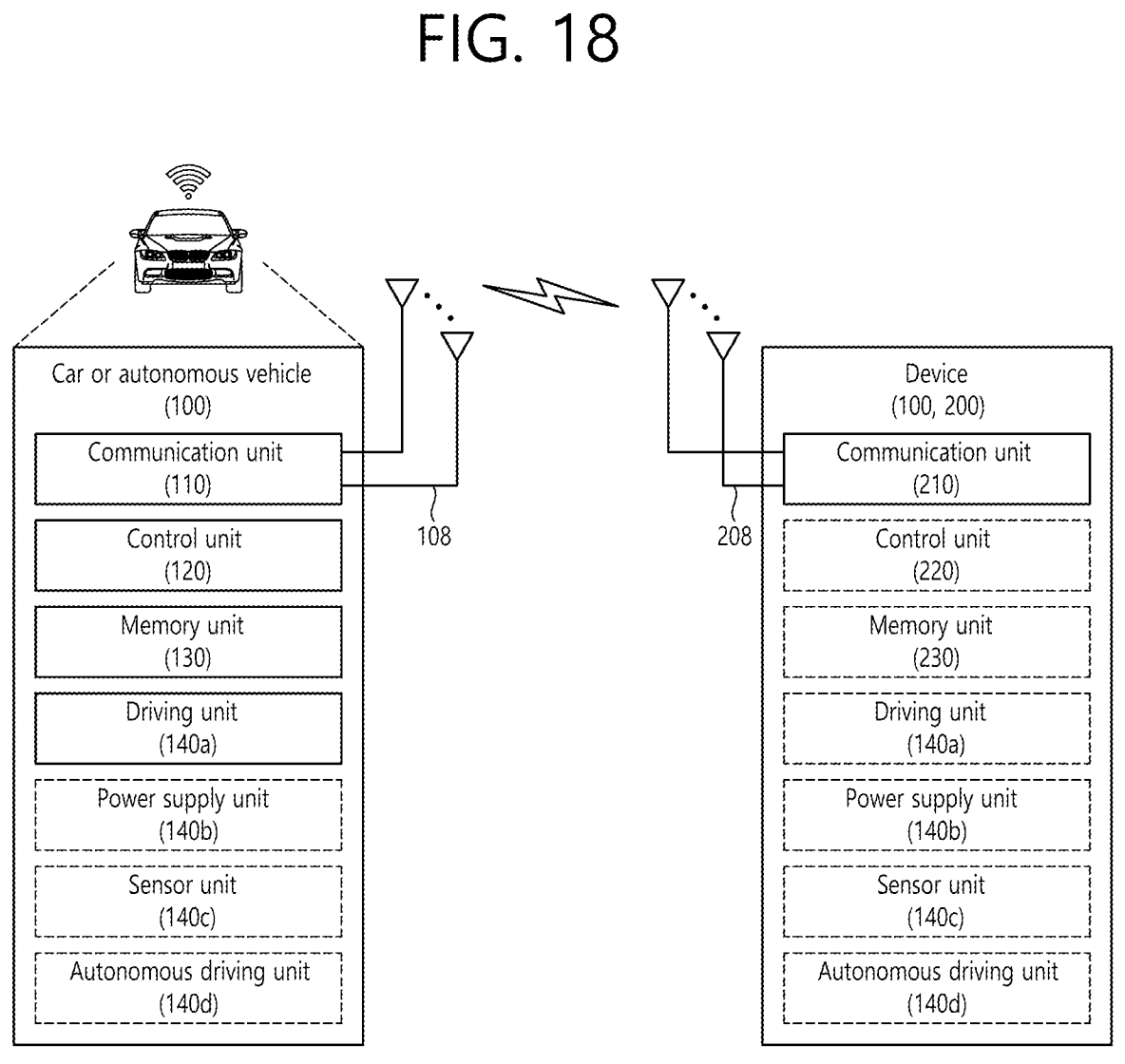

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 18 may be combined with various embodiments of the present disclosure.

Referring to FIG. 18, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by the first device, the method comprising:
   obtaining sidelink (SL) discontinuous reception (DRX) configuration including information related to SL DRX active time of the first device;
   receiving, from a second device, information related to a plurality of resources,
   wherein the information related to the plurality of resources includes information related to a frequency resource of the plurality of resources and information related to a time resource of the plurality of resources;
   performing a monitoring operation within SL DRX active time based on resource information; and
   based on not receiving, from the second device, first sidelink control information (SCI) through first physical sidelink control channel (PSCCH), for scheduling a first physical sidelink shared channel (PSSCH) and a second SCI, on N resources among the plurality of resources, determining a resource after the N resources as a non-valid resource,
   wherein N is a positive integer.

2. The method of claim 1, further comprising:
   based on that the resource after the N resources is the non-valid resource, skipping the monitoring operation within the SL DRX active time based on the resource information.

3. The method of claim 2,
   wherein the monitoring operation within the SL DRX active time based on the resource information includes a monitoring for reception of information transmitted from the second device on the plurality of resources.

4. The method of claim 3,
   wherein the monitoring operation within the SL DRX active time based on the resource information includes the monitoring and a start of the SL DRX timer based on a success of a reception based on the monitoring.

5. The method of claim 4,
   wherein the SL DRX timer includes at least one of SL DRX inactivity time or SL DRX retransmission timer.

6. The method of claim 3,
   wherein the monitoring operation within the SL DRX active time based on the resource information includes the monitoring and a skipping of the start of the SL DRX timer based on a success of a reception based on the monitoring.

7. The method of claim 1,
   wherein the information related to the plurality of resources includes information for a resource reservation period, and
   wherein the N resources is a resource within a first period among the resource reservation period.

8. The method of claim 7,
   wherein, based on that any of the first SCI is not received on the N resources, the resource after the N resources is determined as the non-valid resource.

9. The method of claim 8,
   wherein a time interval among the N resources the is identical, and
   wherein the N is 3.

10. The method of claim 7,
    wherein a resource related to the resource reservation period among the resource after the N resources is determined as the non-valid resource.

11. The method of claim 7,
    wherein M resources among the N resources are the resource within the first period, wherein M is the positive integer, smaller than the N, and wherein a resource after the M resources is included in a second period next to the first period.

12. The method of claim 1, wherein, based on that the first SCI is not successfully received from the second device based on a resource reselection of the second device or a transmission drop of the second device, the resource after the N resources is determined as the non-valid resource, wherein the resource reselection is a resource reselection based on a resource reselection based on a re-evaluation or based on a resource reselection based on a pre-emption checking, and wherein the transmission drop is at least one of a transmission drop based on a uplink (UL)-SL prioritization or a transmission drop based on a congestion control.

13. The method of claim 1, wherein, based on that the first SCI is not successfully received from the second device based on a failure of a decoding of the first device, the resource after the N resources is determined as the non-valid resource.

14. A first device performing wireless communication, the first device comprising:

at least one memory storing instructions;

at least one transceiver; and at least one processor connected to the at least one memory and the at least one transceiver, wherein the at least one processor is adapted to execute instructions to perform operations comprising:

obtaining sidelink (SL) discontinuous reception (DRX) configuration including information related to SL DRX active time of the first device;

receiving, from a second device, information related to a plurality of resources, wherein the information related to the plurality of resources includes information related to a frequency resource of the plurality of resources and information related to a time resource of the plurality of resources;

performing a monitoring operation within SL DRX active time based on resource information; and based on not receiving, from the second device, first sidelink control information (SCI) through first physical sidelink control channel (PSCCH), for scheduling a first physical sidelink shared channel (PSSCH) and a second SCI, on N resources among the plurality of resources, determining a resource after the N resources as a non-valid resource, wherein N is a positive integer.

15. An apparatus adapted to perform a first user equipment, the apparatus comprising:

at least one processor; and at least one memory connected to the at least one processor and storing instructions that, based on being executed by the at least one processor, cause the first user equipment to perform operations comprising:

obtaining sidelink (SL) discontinuous reception (DRX) configuration including information related to SL DRX active time of the first device;

receiving, from a second device, information related to a plurality of resources, wherein the information related to the plurality of resources includes information related to a frequency resource of the plurality of resources and information related to a time resource of the plurality of resources;

performing a monitoring operation within SL DRX active time based on resource information; and based on not receiving, from the second device, first sidelink control information (SCI) through first physical sidelink control channel (PSCCH), for scheduling a first physical sidelink shared channel (PSSCH) and a second SCI, on N resources among the plurality of resources, determining a resource after the N resources as a non-valid resource, wherein N is a positive integer.

16. The apparatus of claim 15, the operations further comprising:

based on that the resource after the N resources is the non-valid resource, skipping the monitoring operation within the SL DRX active time based on the resource information.

17. The apparatus of claim 16, wherein the monitoring operation within the SL DRX active time based on the resource information includes a monitoring for reception of information transmitted from the second device on the plurality of resources.

18. The apparatus of claim 17, wherein the monitoring operation within the SL DRX active time based on the resource information includes the monitoring and a start of the SL DRX timer based on a success of a reception based on the monitoring.

19. The apparatus of claim 18, wherein the SL DRX timer includes at least one of SL DRX inactivity time or SL DRX retransmission timer.

20. The apparatus of claim 17, wherein the monitoring operation within the SL DRX active time based on the resource information includes the monitoring and a skipping of the start of the SL DRX timer based on a success of a reception based on the monitoring.

* * * * *